(12) United States Patent
Achan et al.

(10) Patent No.: US 11,481,753 B2
(45) Date of Patent: Oct. 25, 2022

(54) SYSTEMS AND METHODS FOR MAPPING IN-STORE TRANSACTIONS TO CUSTOMER PROFILES

(71) Applicant: Walmart Apollo, LLC, Bentonville, AR (US)

(72) Inventors: Kannan Achan, Saratoga, CA (US); Afroza Ali, Los Altos, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 49 days.

(21) Appl. No.: 16/900,759

(22) Filed: Jun. 12, 2020

(65) Prior Publication Data

US 2020/0311707 A1    Oct. 1, 2020

Related U.S. Application Data

(63) Continuation-in-part of application No. 16/544,876, filed on Aug. 19, 2019, now Pat. No. 10,685,341, which is a continuation of application No. 16/154,667, filed on Oct. 8, 2018, now Pat. No. 10,387,864, which is a continuation of application No. 13/905,863, filed on May 30, 2013, now Pat. No. 10,096,013, application No. 16/900,759, which is a continuation-in-part of application No. 13/907,533, filed on May 31, 2013, now abandoned.

(51) Int. Cl.
*G06Q 20/22* (2012.01)
*G06Q 40/00* (2012.01)

(52) U.S. Cl.
CPC ........... *G06Q 20/22* (2013.01); *G06Q 20/227* (2013.01); *G06Q 40/00* (2013.01)

(58) Field of Classification Search
None
See application file for complete search history.

(56) References Cited

U.S. PATENT DOCUMENTS 6,923,369 B2   8/2005  Brady et al.
7,007,020 B1   2/2006  Chen et al.
(Continued)

OTHER PUBLICATIONS

Ann Borestann and Heiko Schmiedel, "Interchange Fees in Card Payments," European Central Bank, Occasional Paper Series, No. 131, 6-50, Sep. 2011.

*Primary Examiner* — Scott A Zare
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform: receiving a query from a front-end device for one or more users mapped to a same payment option; generating, using a machine learning model, a first dataset comprising one or more classifications of one or more online users mapped to the same payment option as either (i) a single user with multiple user profiles or (ii) multiple users of a same household; generating, using a factor graph, a second dataset comprising first information of the one or more online users mapped to second information of one or more instore users; mapping at least one of the one or more online users to at least one of the one or more instore users based on the second dataset. Other embodiments are disclosed.

20 Claims, 15 Drawing Sheets

(56) References Cited

U.S. PATENT DOCUMENTS

| | | |
|---|---|---|
| 7,729,940 B2 | 6/2010 | Harvey et al. |
| 8,010,562 B2 | 8/2011 | Barrett et al. |
| 8,065,233 B2 | 11/2011 | Lee et al. |
| 8,332,271 B1 | 12/2012 | Wilder et al. |
| 8,577,730 B2 | 11/2013 | Gonzalez Loyo |
| 10,803,102 B1 * | 10/2020 | Ray ................... G06Q 30/0201 |
| 2002/0065774 A1 | 5/2002 | Young et al. |
| 2009/0234715 A1 | 9/2009 | Heiser, II et al. |
| 2009/0276300 A1 | 11/2009 | Shaw et al. |
| 2012/0117633 A1 | 5/2012 | Chakra et al. |
| 2012/0278177 A1 | 11/2012 | Bender et al. |
| 2013/0041837 A1 | 2/2013 | Dempski et al. |
| 2013/0110992 A1 | 5/2013 | Ravindra et al. |
| 2013/0159072 A1 | 6/2013 | Vadhri |
| 2013/0332344 A1 | 12/2013 | Weber |
| 2014/0040013 A1 | 2/2014 | Zhai et al. |
| 2014/0074928 A1 | 3/2014 | B'Far et al. |
| 2014/0180826 A1 | 6/2014 | Boal |
| 2019/0087809 A1 * | 3/2019 | Bloy ................... G06Q 20/227 |

* cited by examiner

SYSTEMS AND METHODS FOR MAPPING IN-STORE TRANSACTIONS TO CUSTOMER PROFILES

CROSS-REFERENCE TO RELATED APPLICATIONS

This application is a continuation-in-part of U.S. patent application Ser. No. 13/907,533, filed May 31, 2013, and U.S. patent application Ser. No. 16/544,876, filed Aug. 19, 2019. U.S. patent application Ser. No. 16/544,876 is a continuation of U.S. patent application Ser. No. 16/154,667, filed Oct. 8, 2018, now issued as U.S. Pat. No. 10,387,864, which is a continuation of U.S. patent application Ser. No. 13/905,863, filed May 30, 2013, now issued as U.S. Pat. No. 10,096,013. U.S. Pat. Nos. 10,387,864 and 10,096,013, and U.S. patent application Ser. Nos. 13/907,533 and 16/544,876 are incorporated herein by reference in their entirety.

TECHNICAL FIELD

The present disclosure relates to electronic commerce and, in particular, to systems and methods for clustering of e-commerce customers using patterns in e-commerce transactions by customers and to systems and methods for mapping in-store transactions to existing customer profiles. The present disclosure also relates to electronic commerce and, in particular, to systems and methods for clustering of e-commerce customers using patterns in e-commerce transactions by customers.

BACKGROUND

Electronic commerce, commonly known as e-commerce, has become a popular way of shopping for many in recent years. Given the growing trend of online shopping by consumers around the world, many brick-and-mortar businesses are beginning to or have begun to operate e-commerce websites as a new sales channel as well as a new source of revenue stream. In other cases, brick-and-mortar business may be affiliated with online businesses that operate e-commerce websites, and vice versa. For a business that operates one or more physical retail stores and an e-commerce website, it is not uncommon that some of its customers shop not only in the physical stores but also online on the e-commerce website operated by the business as an e-commerce merchant. When an e-commerce customer, or online customer, conducts transactions such as purchase of goods on an e-commerce web site operated by an e-commerce merchant, the e-commerce merchant generally will establish and maintain a customer profile for the online customer. A customer profile typically includes the first name, last name and mailing (physical) address, and may also include additional personal information related to the respective online customer, e.g., phone number, e-mail address, credit card information, etc.

From the perspective of a business that operates one or more physical retail stores as well as an e-commerce website, it would be ideal to map in-store transactions to existing, valid customer profiles. In an example scenario, customer A buys a large flat-screen TV at a retail store operated by business B and swipes a credit card to complete the transaction, and customer A later logs into the e-commerce website operated by business B. For business B, applications of such information are plenty if a unique identification pertaining to the credit card used in-store by customer A could be mapped or matched to a customer profile in a database of valid customer profiles maintained by business B. For example, recommendations could be precisely targeted based on in-store purchases, customer A could be enticed to share a review of the flat-screen TV, and business B could learn what customers who recently purchased a TV may be interested in purchasing next, and so on.

Most e-commerce merchants require a user, or e-commerce customer, to create an e-commerce customer account for conducting transactions, e.g., purchase and/or sale of goods, on the e-commerce website maintained by the e-commerce merchant. An e-commerce customer account typically includes credentials such as user name and password for login onto a respective e-commerce website. For security or other reasons, the same e-commerce customer may have different user names and/or passwords for various e-commerce websites. From time to time, an e-commerce customer may forget his/her login credentials for a given e-commerce website and, under the circumstances, the e-commerce customer may establish a new user name and/or password for the e-commerce website the login credentials for which he/she forgot. In other words, the same e-commerce customer ends up with more than one e-commerce customer accounts, or profiles, for the same e-commerce website. From the perspective of the e-commerce merchant, however, this situation is not desirable at least for the purposes of targeting and providing recommendations to e-commerce customers. Moreover, the existence of duplicate profiles for the same e-commerce customer introduces artificial sparseness in the customer-to-item relationship from the e-commerce merchant's perspective.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
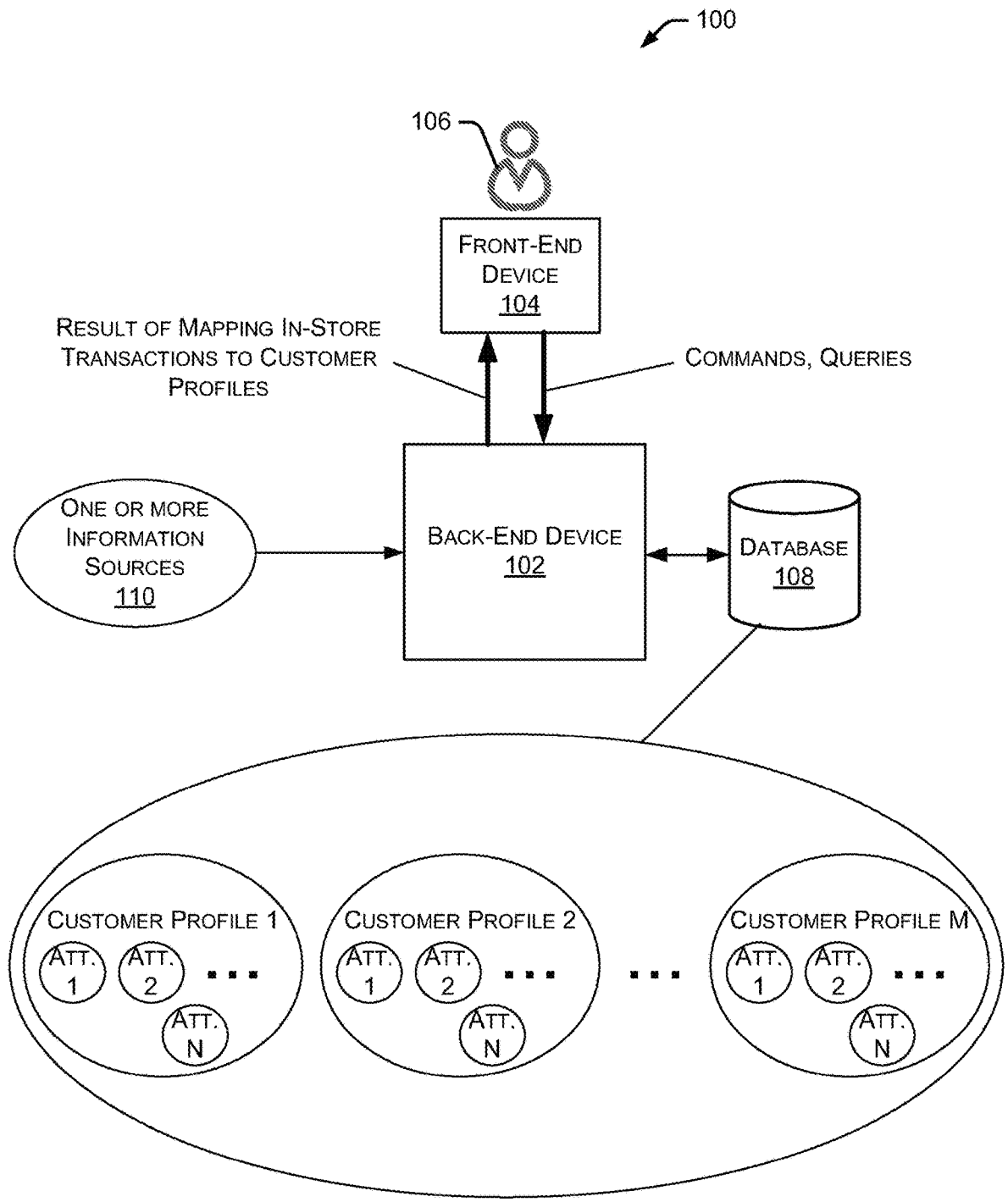
FIG. 1 is a block diagram depicting an example framework in accordance with the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The proposed systems, methods, algorithms and techniques described herein address the problem of mapping in-store transactions associated with traceable tenders to valid customer profiles. It is assumed that there exists a database containing known and valid customer profiles. The customer profiles may be obtained through various channels, e.g., paid memberships from partner stores, online users with registered profiles, etc. It is noteworthy that the techniques and algorithms described herein utilize a unique identifier of a traceable tender to map in-store transactions to customer profiles. Other details on the traceable tender itself, such as name and address for example, are not explicitly stored. Also, occasionally, a third party may provide supplemental information about a user of a given traceable tender. Given that in-store transactions contribute towards the majority of sales for a brick-and-mortar business, the task of identifying retail store customers of the brick-and-mortar business with high fidelity is fundamental towards any attempt to obtaining a unified view of customers and their transactions.

Framework 100 includes back-end device 102 and front-end device 104. Back-end device 102 may include one or more processors that execute operations pertaining to algorithms described in the present disclosure. Optionally, database 108 may be communicatively coupled to back-end device 102 to cache or otherwise store some or all of the information and data received, collected and processed by the one or more processors of back-end device 102. In some implementations, database 108 may be an integral part of back-end device 102. Back-end device 102 may be any type of computing device such as, for example, one or more of a desktop computer, a workstation, a server, a mainframe computer, a portable device, etc. Front-end device 104 may be any type of user-interface device including, for example, a combination of one or more of a display panel, a monitor, a keyboard, a computer mouse, a stylus, a keypad, a touch-sensing screen, a voice-command device, or any suitable user-interface device conceivable in the future. Alternatively, front-end device 104 may be any type of computing device such as, for example, a desktop computer, a workstation, a laptop computer, a notebook computer, a tablet, a smartphone, a personal digital assistant, or any suitable handheld device.

Back-end device 102 and front-end device 104 may be integral parts of an apparatus or, alternatively, may be communicatively coupled directly or indirectly through one or more communication devices or one or more networks. In implementations where back-end device 102 and front-end device 104 communicate with one another through one or more networks, the one or more networks may include, for example, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN) or the Internet. In implementations where back-end device 102 and front-end device 104 communicate with one another through one or more networks including at least one wireless network, the at least one wireless network may be, for example, based on one or more wireless standards such as IEEE 802.11 standards, WiFi, Bluetooth, infrared, WiMax, 2G, 2.5G, 3G, 4G, Long Term Evolution (LTE) and/or future versions and/or derivatives thereof.

User 106, an operator of an e-commerce website, operates front-end device 104 to access back-end device 102. For example, through front-end device 104, user 106 sends commands and/or queries to back-end device 102 to view results of mapping of in-store transactions to customer profiles. In response, back-end device 102 provides a result of mapping of in-store transactions to customer profiles by displaying, e.g., on front-end device 104, one or more in-store customers associated with one or more in-store transactions that are mapped to one or more customer profiles of one or more online customers.

Database 108 maintains a database of a number of valid customer profiles of a number of online customers. As shown in FIG. 1, each customer profile includes a number of types of attributes, e.g., Att. 1, Att. 2 . . . Att. N as shown in FIG. 1, associated with the respective online customer. The types of attributes may include, for example, first name, last name, physical (mailing) address, and one or more traceable tenders of the respective online customer. Optionally, the types of attributes may include additional information related to the online customer such as, for example, e-mail address, phone number, preferences, purchase history, order details, etc.

Other than database 108, back-end device 102 may receive information related to in-store customers and/or online customers from one or more information sources 110. The one or more information sources 110 may include, for example, partner stores, business affiliates, credit bureaus, consumer reporting agencies, etc.

Referring to the example scenario where customer A buys a large flat-screen TV at a retail store operated by business B using a credit card and later logs into the e-commerce website operated by business B, the problem to be solved can be reduced to the following: Given a unique identifier (ID) x associated with a credit card (or any other suitable traceable tender) used in store and a database of valid customer profiles P, how can a single customer profile or multiple customer profiles from P be associated with, or mapped to, the user of x? Each of the customer profiles in P typically includes name and address information that the respective customer provided to the affiliate or e-commerce website, along with unique IDs of credit cards (or one or more other suitable traceable tenders) from past transaction history. With just x available, there is not much that can be done. However, the presence of P makes it possible to leverage some information in P to tag or map x with a customer profile. For illustrative purpose and not limiting the scope of the present disclosure, the term "traceable tender" refers to a credit card in the examples described hereinafter, but may be a debit card or any other suitable traceable tender.

If a credit card x used by a customer in a retail store was also used by a customer with customer profile p in P, then it is reasonable to believe that the user of x is indeed p. However, the task becomes complicated given multiple pieces of competing evidence that do not necessarily agree. Furthermore, there is a need to account for evidence from multiple information sources. Accordingly, the proposed techniques and algorithms use a principled framework to perform probabilistic inference, which is described below.

Let $U=\{u_1, u_2, \ldots u_N\}$ represent the set of all customers who had in-store transactions associated with them, where $u_i$ represents a customer who used the credit card with the unique ID of $x_i$ in a retail store. Let P denote the set of all customer profiles known a priori. For every $p_j$ in P, relevant details of customer profiles are known, such as last name, first name, physical address and one or more unique IDs pertaining to credit cards used in the past. Here, $u_i$ is an unobserved random variable, i.e., $u_i$ has an associated customer profile but it is not known to the brick-and-mortar business and/or e-commerce merchant yet. On the other hand, P consists of fully observed variables (customer profiles). It is assumed that the profile pertaining to $u_i$ is in P. The goal of probabilistic inference is then to find a distribution over as expressed by equation (1) below. Here the state space of $u_i$ is P.

$$P(u_i|P,x_i)=P(u_i|\{\text{customer profiles in } P \text{ that used } x_1\}) \quad (1)$$

Notice that if the information present in the intersection of credit card usage is not utilized, the maximum entropy principle will place a uniform distribution over $u_i$, i.e., all customer profiles are equally likely. Also, all nodes in U that do not share a credit card with at least one profile in P are represented a uniform representation over customer profiles in P. Alternatively, all nodes in U that do not share a credit card with some customer profiles in P may be removed from the graph.

Overlap in credit card usage among customer profiles will introduce certain dependencies between variables in the graph. These dependencies can be used to draw a probabilistic graphical model, which then allows for efficient inference algorithms. Here, a factor graph is used to model the dependencies between variables. A factor graph has two kinds of nodes: variable nodes and function nodes. A factor graph is a bipartite graph, in the sense that there are edges only between variable and function nodes, but not between nodes of the same kind. Role of a function node is to model the interaction between the variable nodes that connect to the function node. A function node encodes the logic of assimilating evidence from its neighbors and makes meaningful assignments to all the unobserved variable nodes connected to it.

Figure 2:
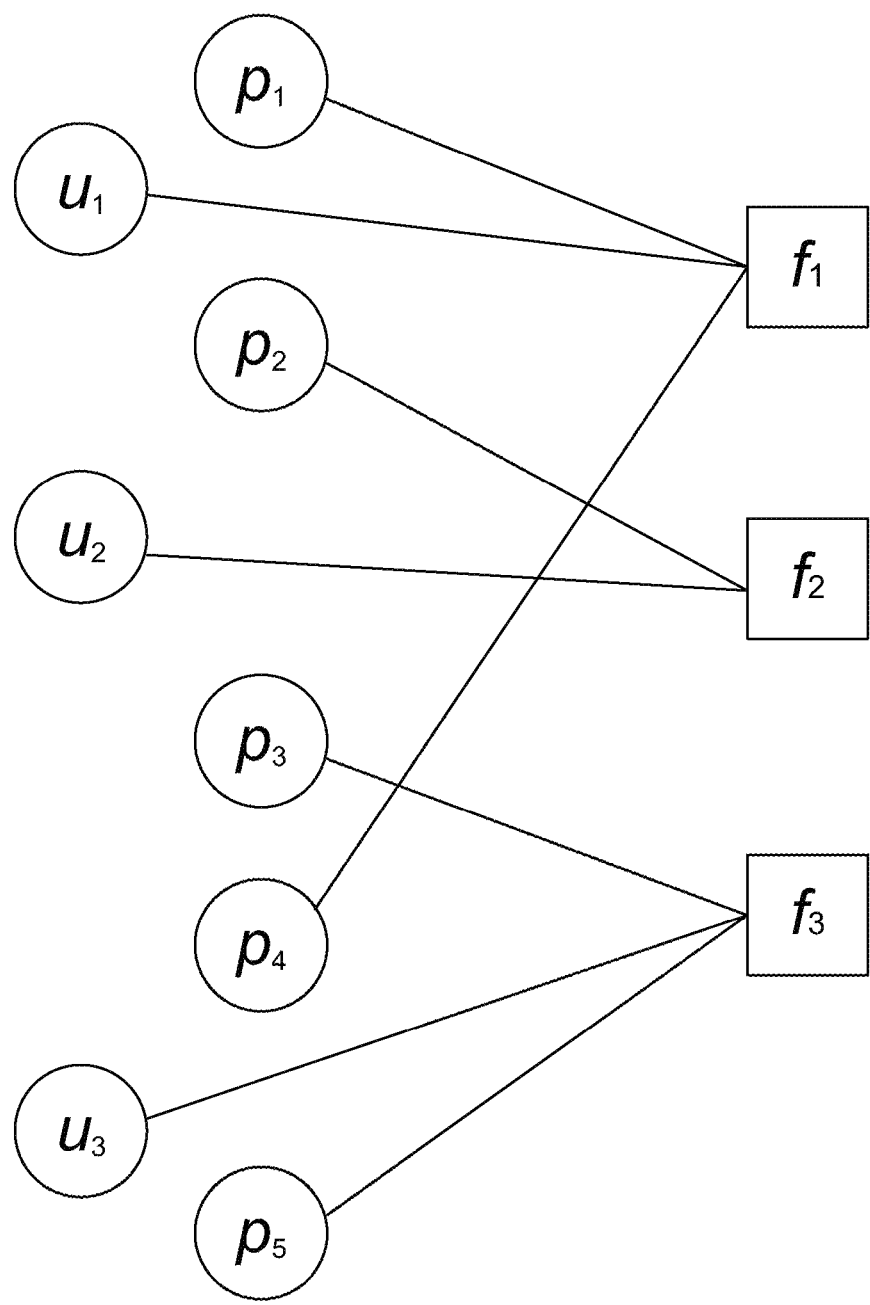
FIGS. 2-5B are diagrams depicting example implementations of an algorithm in systems and methods in accordance with the present disclosure.

Referring to FIG. 2, the factor graph represents a data set including nodes $p_1$ $p_2$, $p_3$, $p_4$ and $p_5$ which correspond to observed variables, e.g., those corresponding to a retail store chain and an e-commerce website where customers are required to register with valid name and address. The nodes $u_1$, $u_2$ and $u_3$ correspond to customers of in-store transactions and they are unobserved because no customer information, e.g., name and address, was obtained or required at the point of sale. Here, a function node is created for every credit card associated with a profile in U. Variables in the factor graph can be observed (elements in P) or unobserved (elements in U). Given a function node $f_k$ pertaining to a credit card $x_k$, all variable nodes (customers) that have used $x_k$ at least once to complete a transaction are connected.

A function node sends and receives messages from all its neighbors. An outgoing message from a variable node advertises its observed value (or a distribution if unobserved) to the function node. In turn, the function node processes all its incoming messages and "enforces" the most likely distribution to all unobserved nodes connected to it.

Figure 3:
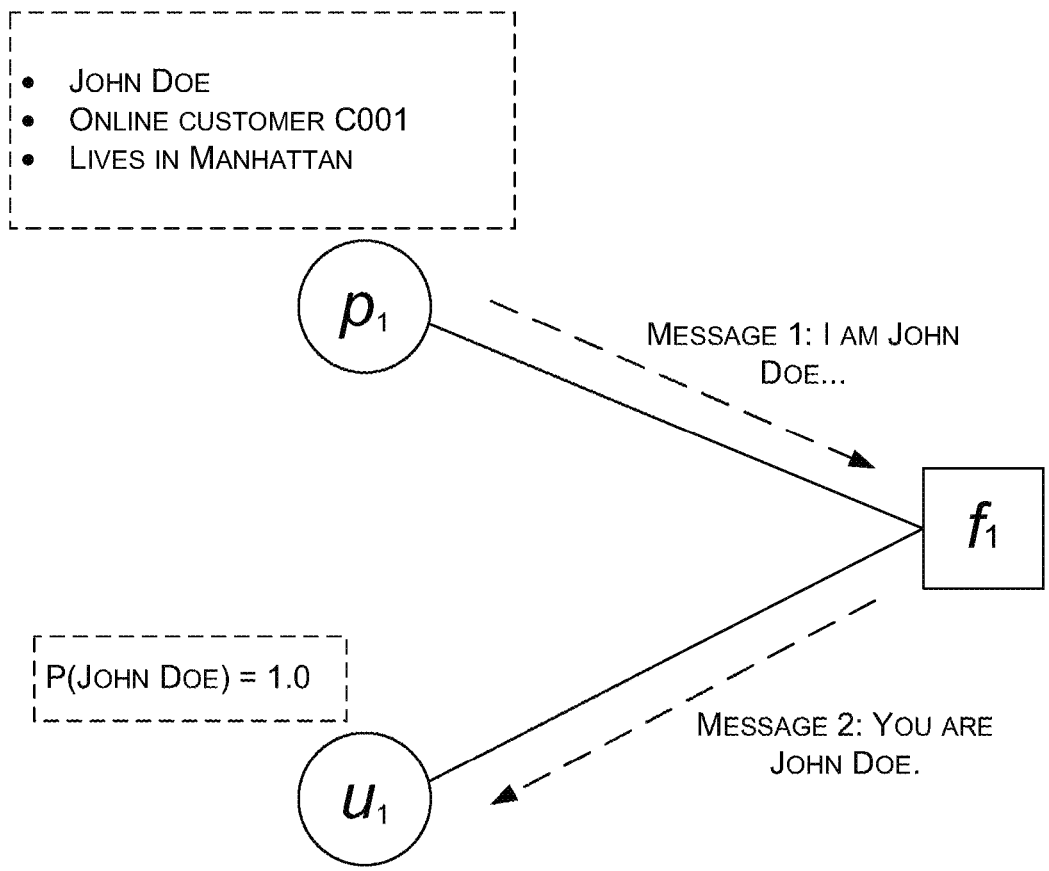

If a function node $f_k$ is connected to exactly one observed node pi and exactly one unobserved node $u_k$, then $f_k$ while computing $P(u_k|p_1)$ would place all the probability mass on the observed profile, as shown in FIG. 3. As shown in FIG. 3, exactly one observed and exactly one unobserved node are in the factor graph. As there is no competing evidence, the function node $f_1$ passes the incoming information from the observed variable node $p_1$ to the unobserved variable node $u_1$.

Figure 4:
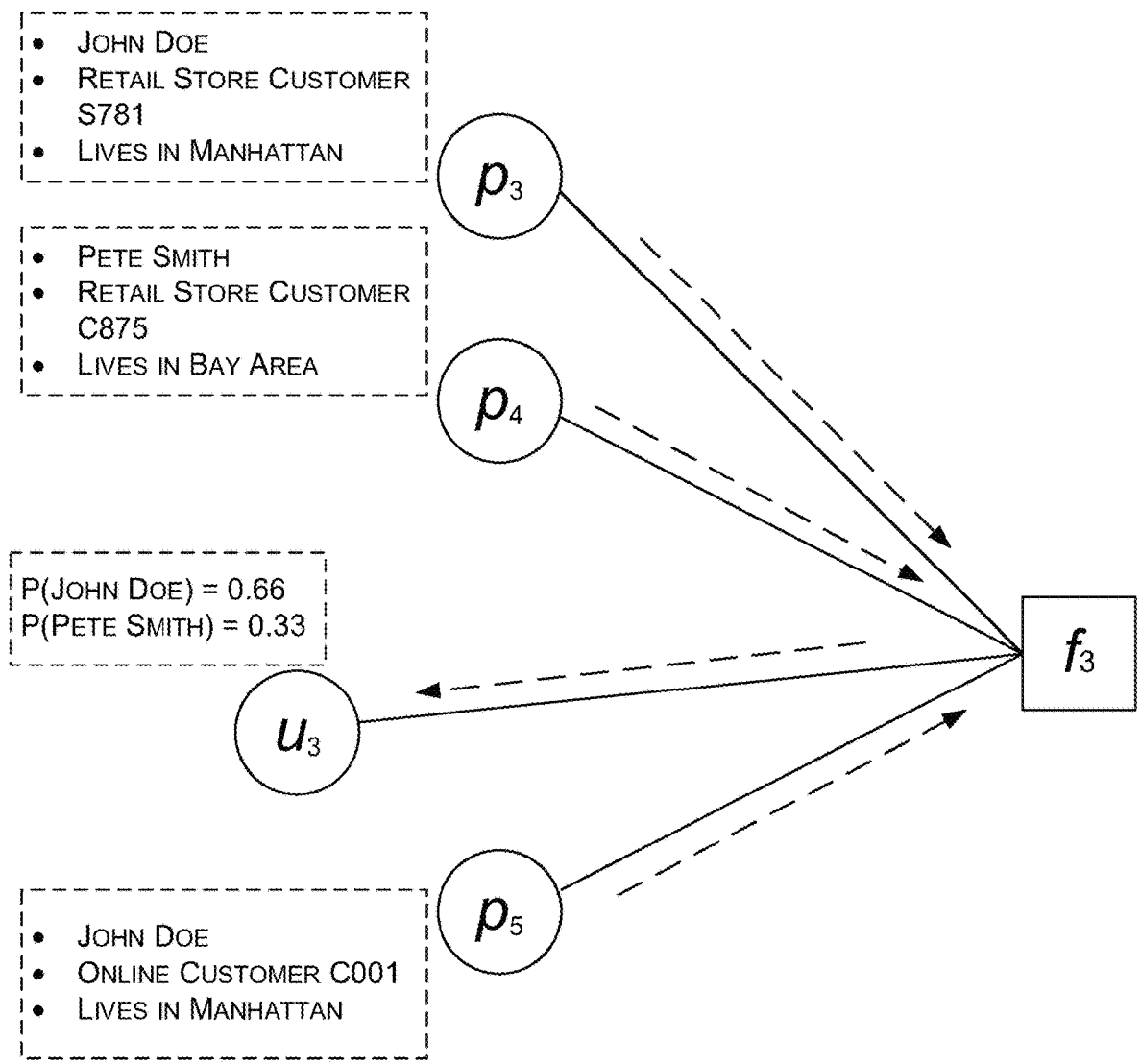

If multiple observed nodes are connected to a function node, then $f_k$, tries to process the information contained in the observed profiles before making an assignment. If the observed profiles are distinct with no name or address similarity, then $P(u_k|pi, p_2, \ldots)$ is uniform across the observed profiles and zero elsewhere. If the observed profiles have some overlap then the probability mass is spread out based on the overlap, as shown in FIG. 4. As shown in FIG. 4, multiple observed variable nodes $p_3$, $p_4$ and $p_5$ feed evidence to a single unobserved variable node $u_3$ through a function node $f_3$. The probability weights shown are examples for illustrative purposes. The function node $f_3$ figures out that customer profiles C001 and S781 pertain to the same individual and hence places a larger weight on it.

The logic encoded in the function node also analyzes incoming profiles to verify if they constitute a household. This may be accomplished by computing last name and address similarity. In the event a household is identified, a special annotation may be made in the unobserved variable node regarding this observation, and all household members may be assigned equal probability.

Figure 5A:
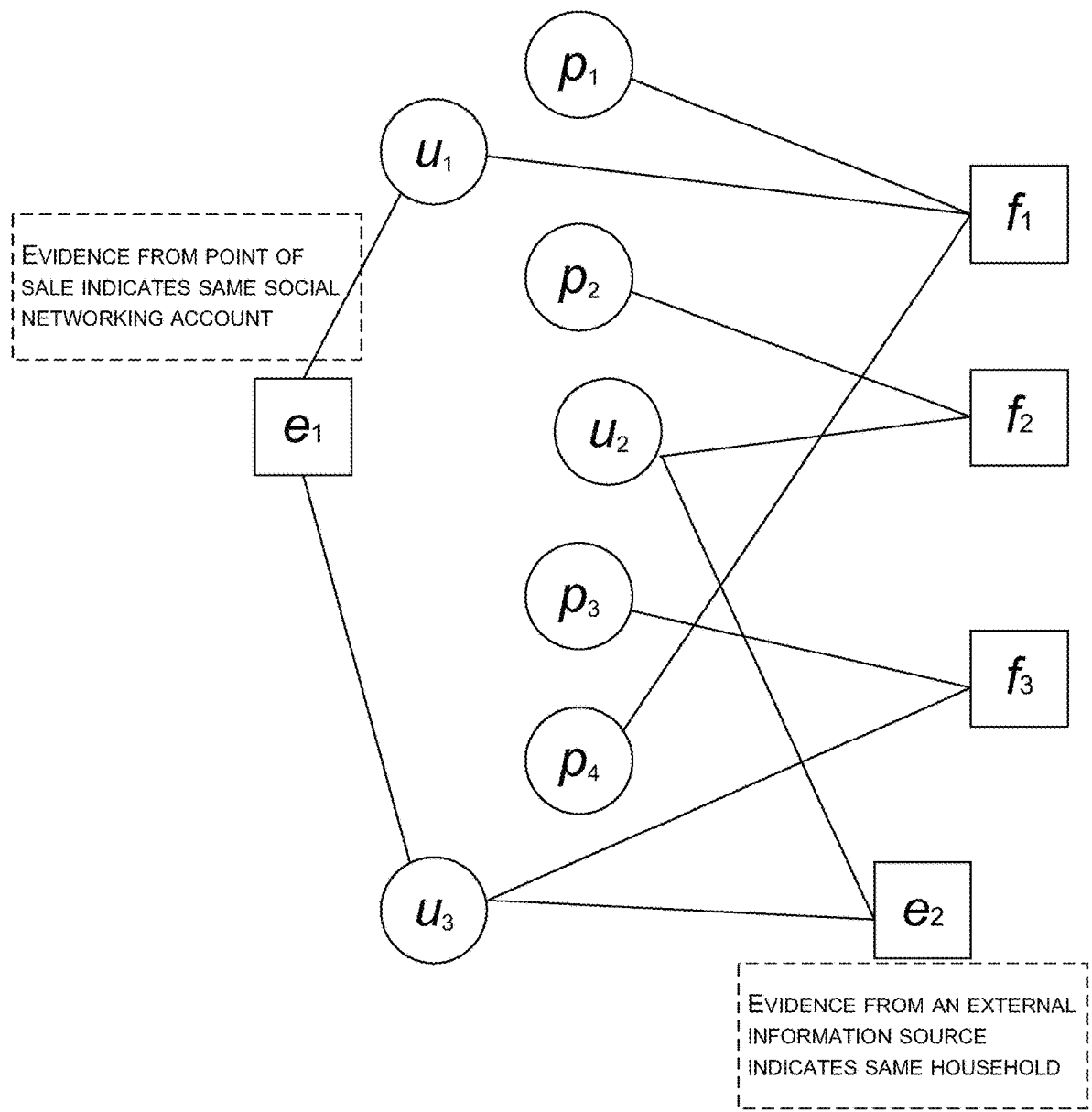
Figure 5B:
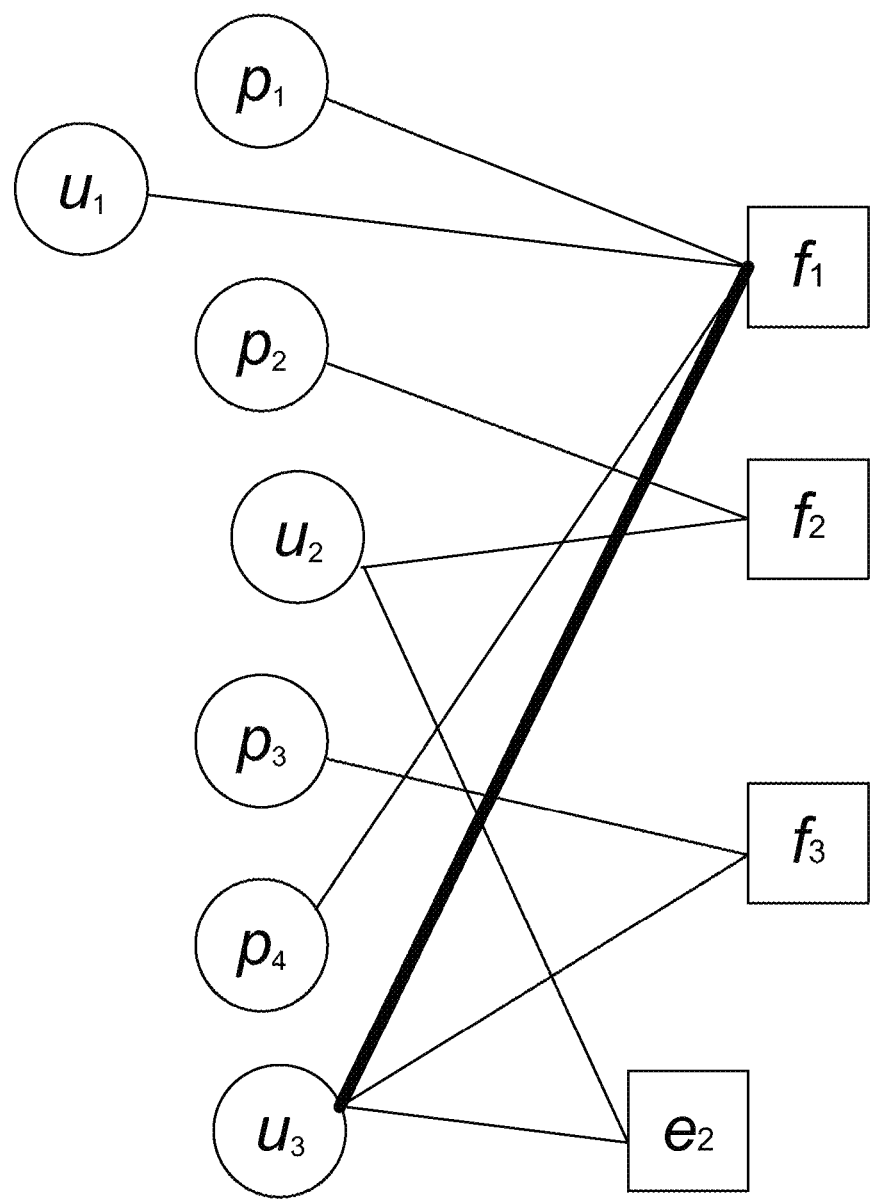

Occasionally, back-end device 102 may receive an indication from the one or more information sources 110 that two in-store transactions ($u_1$'s) are strongly related. For example, a third party, e.g., a credit bureau, may indicate that two traceable tenders used in store pertain to the same customer. In such cases the factor graph can be extended to accommodate this evidence by adding a new function node between the unobserved profiles that could be related, as shown in FIG. 5A and FIG. 5B. FIG. 5A shows an example of leveraging evidence about transactions. By connecting unobserved variable nodes that are related, the algorithm can still reason by passing messages. However, the presence of cycles in the graph would require a few iterations before the messages reach a stationary point. A cycle-free graph can still be arrived by folding auxiliary evidence into existing function nodes. As shown in FIG. 5B, the factor graph illustrates fusing the auxiliary evidence shared between $u_1$ and $u_2$ into $f_i$. This is bound to increase the complexity of the logic in the function nodes. Given that the factor graph is sparse for most part, this would not be a computational overhead, and has the desirable property of converging in one pass.

Occasionally customers share one or all of phone numbers, e-mail addresses, social media affiliations among others at the point of sale in a retail store. Such information can also be used to connect in-store transactions. At an extreme, where possible and applicable, one can envision leveraging biometric information, e.g., applying evidence from face recognition on images collected at a point of sale terminal. Such auxiliary information may lead to a richly connected graph, thus improving the quality of probabilistic inference.

In many embodiments, function to variable message states that a function $f_1$ is connected to variable nodes $v_a$, $v_b$, $v_c$ and $v_d$ on the factor graph, where the message from function node $f_1$ to variable node $v_d$ can be expressed in the form of equation 2:

$$m_{f_1 \to v_d}(v_d=k) = \sum_{v_a} m_{v_a \to f_1} \sum_{v_c} m_{v_c \to f_1} f_1(v_a, v_b, v_c, v_d=k) \qquad (2)$$

where m represents a message from $f_1$ to variable node $v_d$, enforcing a particular value k, involves aggregating the incoming evidence to the function node, and applying the function to variable node $v_d$.

Referring to equation 2, in various embodiments, the function of $f_1$ can be viewed as a function that enforces compatibility of variables connecting to it. In some embodiments, variable nodes, such as variable nodes, $v_a$, $v_b$, $v_c$, and $v_d$, can refer to variables in the system that can be (i) observed variables or (ii) treated as probabilistic random variables. For example, variable node $v_a$ can correspond to a probabilistic random variable pertaining to gender with a state space of two values, e.g., male and female, where the quantities of interest can be expressed as: $P(v_a=\text{'male'})$ and $P(v_a=\text{'female'})$. In several embodiments, the term $m_{v_c \to f_1}$ can refer to a message that variable node c can send to the function node $f_1$. In many embodiments, when a variable node is observed, the variable node transmits a probability distribution that can be peaked at the observed value. For example, in the above case, when variable $v_a$ can be observed to be 'male', then, $[P(v_a=\text{'male'})=1.0, P(v_a=\text{'female'})=0.0]$, can be set as the outgoing message. In another example, when variable $v_a$ cannot be observed (in which case it can be a random variable), then variable $v_a$ value can be set as per equation (3), as described below in greater detail. In some embodiments, the term $v_{f_1 \to v_d(v_d=K)}$ can refer to a message that a function node can send to a variable node, where the term $m_{f_1 \to v_d(v_d=K)}$ can be viewed as the assessment of the function node of the one or more values that variable node $v_d$ can assume. In various embodiments, in order to achieve the one or more values that variable node $v_d$ can assume, a function node also can be a neighborhood function ("N"), where the neighborhood function can pool messages from each of the function nodes that can be connected neighbors and can apply the compatibility function $f_1$ on the incoming messages that can be expressed as, $m_{v_a \to f_1}$, $m_{v_b \to f_1}$, $m_{v_c \to f_1}$.

In some embodiments, a message from a variable node to function node can be expressed in the form of equation 3:

$$m_{v_d \to f_1} = \pi_{i \in \{N(v_d)\setminus f_1\}} m_{f_i \to v_d} \qquad (3)$$

where m represents a message, N represents a neighborhood function, and $m_{v_d \to f_1}$ represents a message from variable node $v_d$ to function node $f_1$. The quantity $m_{f_i \to v_d}$ denotes the message from function node $f_i$ to variable node $v_d$. $N(v_d \setminus f_1)$ is used to represent all the nodes connected to $v_d$, except $f_1$.

In many embodiments, messages from variable node to function node can be a fusion of all messages that flow into a variable node, except the variable node to which the function node can be sending a message.

Referring to equation 3, the term $m_{v_d} \to f_1$ can be a product of all incoming messages sent to variable node $v_d$, except when a message can be sent from function node $f_1$. In some embodiments, variable node $v_d$ can: (i) collect an estimate of the value of variable node $v_d$ from its neighbors, (ii) multiply the estimated values, and (iii) send the estimated values as an outgoing message to $f_1$.

In many embodiments, variable nodes on a factor graph can encode various types of evidence and/or information linked to one or more traceable tenders (e.g., payment method, credit card), where one or more touch points associated with the various types of evidence that can be connected to the one or more traceable tenders, similar to the interrelationships between the variable nodes and the functions shown in exemplary factor graphs FIGS. 2-5B above. For example, an exemplary scenario associated with a credit card can include touch points such as:

- A user (e.g., customer) can use a credit card X1234 to open an online account, such as an online account (e.g., membership) with walmart.com and/or any other suitable online website.
- A same user also can use the same credit card (e.g., X1234) to open an account (e.g., membership) at physical store, such as Sam's club and/or any other suitable physical store.
- The same user additionally can use the same credit card (e.g., X1234) in a physical retail store where a photograph (e.g., picture, digital image) of the customer can be recorded simultaneously while using the credit card at a point of sale (POS) terminal.
- The same user further can disclose user contact information at the POS terminal in order to obtain a promotion, where the contact information, such as an email address, a phone number, and/or other suitable contact information can be applied to the factor graph as an observed variable.

Figure 14:
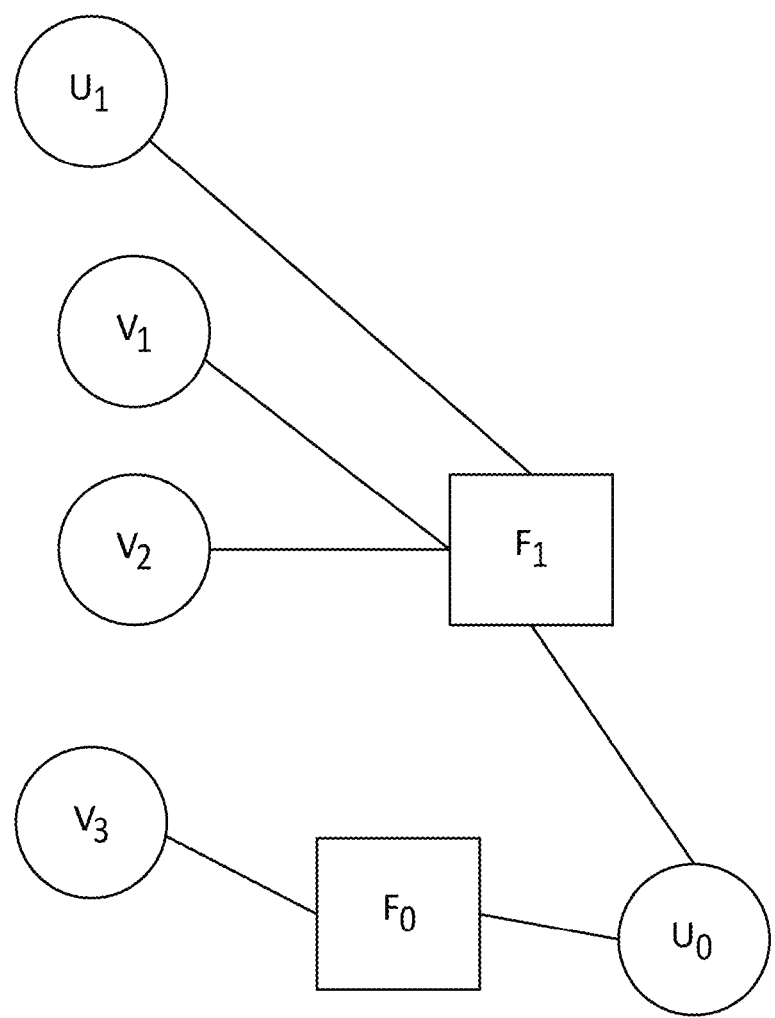
FIG. 14 is a block diagram depicting an example implementation of an algorithm in systems and methods in accordance with the present disclosure.

Jumping ahead in the drawings, FIG. 14 refers to a factor graph with one or more functions that can compute the probabilities for a gender classification based on an image that also can map instore transactions to one or more user profiles. In many embodiments, a machine learning model can be used to determine probabilities by analyzing images that can be classified as either a male gender or a female gender. In some embodiments, an observed variable can include using facial recognition technology to analyze images, such as images in a photograph, a picture, digital image, and/or another suitable image of a user.

In various embodiments, the above examples can represent observed variable nodes, as the examples can include user information including images input as incoming evidence to a function node. In several embodiments, observed variable nodes can include touch points and/or other suitable forms of information obtained from a user. In many embodiments, each of the observed variable nodes can encode some form of evidence about the identity of the user linked to a traceable tender, as shown in FIG. 14.

In many embodiments, when a traceable tender is used by a user, an unobserved variable node can be added to the factor graph. In several embodiments, the unobserved variable node on the graph can be added to encode the identity of the user for whom every traceable tender belongs based on inferences and machine learning data. In many embodiments, the inference between the variable nodes on the factor graph can be used to find a distribution of one or more users that could be owners of the traceable tender, such as a credit card.

In many embodiments, an observed variable node can send messages (e.g., evidence) to the function node, where the function node can be used to assimilate the incoming evidence and to influence the unobserved variables. In the above example, the function node can use the similarity of fields in the user profiles from one or more user accounts, such as user accounts with Walmart, Sam's club, and/or any suitable user accounts and supplement the similarities in the user accounts by identifying a gender of an image captured when the traceable tender was used. In many embodiments, the function node can assign a distribution for the unobserved node based on the similarities and a gender classification.

In some embodiments, the similarity of fields in the user profiles can be used as inferences to determine which user identify can belong to an unobserved node. For example, where an unobserved variable node $V_1$ corresponding to a traceable tender is connected to two observed variable nodes $V_2$, $V_3$, where the two observed variable nodes $V_2$, $V_3$ can be pertaining to a noisy third party information, such as when one of observed variable nodes (e.g., $V_2$) indicates or infers that the traceable tender belongs to a female customer 'Mary Jane', and another of the observed variable nodes (e.g., $V_3$) indicates or infers that the same traceable tender belongs to a male customer 'John Doe'. Without a loss of generality in this example, (i) infer that the state space of random variables, such as unobserved variable node $V_1$, and observed variable nodes $V_2$ and $V_3$, can be limited to user identities, such as user identities, 'John Doe' and 'Mary Jane', and (ii) infer gender nodes $V_{2g}$ and $V_{3g}$, where gender nodes $V_{2g}$ and $V_{3g}$ can represent (e.g., correspond) to the gender of records in the random variable nodes, $V_2$ and $V_3$, respectively. In this example, all of the random variable nodes can be connected to a function node $f_1$ and can ensure consistency of these connections based on a name and a gender similarity. Observed variable node, such as $V_2$, can send a probability distribution to $f_1$ that is peaked at 'Mary Jane', which can be expressed as [$P(V_2=$'MaryJane')=0.99, $P(V_2=$'John Doe'=0.01)]. Similarly, the message from observed variable node, such as $V_3$, can be peaked at 'John Doe', expressed as [$P(V_2=$'MaryJane')=0.01, $P(V_2=$'John Doe'=0.99)]. Similarly, the gender nodes $V_{2g}$ and $V_{3g}$ can send a message that will be peaked near the observed genders.

In many embodiments, in the absence of any other information, the outgoing message from function node $f_1$ to unobserved variable node $V_1$ can give equal probability for one more gender records, as owners of the traceable tender in question, as there can be no compelling information in which to favor one over the other. In several embodiments, the one or more gender records can include gender information encoded as variables $V_2$, $V_3$, $V_{2g}$ and $V_{3g}$. In some embodiments, due to a gender mismatch and a name mismatch between the gender records: the function $f_1(V_2, V_3, V_{2g}$ and $V_{3g})$ can penalize both the configurations, and two equally bad configurations can manifest as equal probabilities when the configurations are normalized. As another example, when gender information is available from the POS terminal, the gender information can be added to the factor graph (not shown) as an additional node, such as another observed variable $V_4$. In various embodiments, observed variable $V_4$ can include information recorded at a POS terminal or recorded by a recording device (e.g., a camera) in a retail environment that can register an image of a customer. In many embodiments, the recorded information from observed variable $V_4$ can be used to determine a gender, as observed and recorded, that can be applied to a probability distribution of the gender of the customer. In this example, information at the additional observed variable $V_4$ can suggest with high probability that the customer using the traceable tender at issue is 'female', then the function node $f_1$ can use this factor to favor information at observed variable $V_2$ as female since there is a gender match.

In many embodiments, the factor graph in FIG. 14 based on using inferences gathered from one function can be used to determine an inferred identify of a user as linked to a traceable tender and probabilities inferred from a second function, which can be used to determine a gender classification of the user. In several embodiments, the second function can supplement the inferences made from the first function to determine the identity of the unobserved variable. In some embodiments, the second function can be based on probabilities of a gender classification from an image using the machine learning model, such as a gender detector model. In many embodiments, training the machine learning model can be based on input data of observed variables matched to one or more traceable tenders and images (e.g., photos, pictures) of the user associated with the traceable tender used in any of the transactions and output data for the machine learning model can include either a male gender classification or a female gender classification.

In some embodiments, identifying, a respective gender of each image captured for each respective user identification, by using the machine learning model, can include a function node assigning a gender to the unobserved variable independent of inferring the identity of the user based on similarities of one or more user profiles.

In many embodiments, the factor graph in FIG. 14 can include a representation of a data set including nodes $V_1$, $V_2$, and $V_3$ which correspond to observed variables. The nodes $V_1$ and $V_2$ correspond to account profiles and $V_3$ corresponds to a recorded image of a user. A function node can be created for the machine learning model that can be used as a gender detector, which can estimate P(gender|image) and can be a good proxy for the function node $F_0$. Similarly, a model that estimates a similarity between user profiles in nodes $V_1$ and $V_2$ can be used to estimate a function node $F_1$. For example, in this variable factor graph the variable node $V_1$ can represent "John Doe, male, living in New York," and variable node $V_2$ can represent "Mary Doe, female, living in New York," based on information accessed in user profiles. Further, function node $F_0$, upon examining the evidence in variable node $V_3$, can compute, via the machine learning model, the probabilities for inferring whether the variable node $V_3$ can be classified by computing probabilities for male and female, which, in one example, can be found to be 0.05 and 0.95, respectively. These values and the observed variables in $V_1$ and $V_2$ can be used as input to the function node $F_2$ (not shown in FIG. 14) where the assignment for $U_1$ can be estimated. In this exemplary factor graph, the user profiles are inconsistent (e.g., disagree) as to which profile can be inferred to the unobserved variables on the factor graph linked to the traceable tender, where the supplementary evidence from $U_0$ can infer that the gender of the unobserved variables (e.g., holder) is female. This can result in the message sent from the function $F_2$ to a variable $U_1$ to be biased towards "Mary Doe." The assignment to unobserved $U_1$ from function $F_1$ can be illustrated in the form P("MaryDoe")=0.75, P("JohnDoe")=0.25, where the assigned identity can be inferred to be "MaryDoe."

In many embodiments, function nodes can readily be learned from machine data. In some embodiments, function node $F_1$ can be a binary classifier that checks whether two 2 user profiles can be the same by analyzing edit distances between names/address, variations in location, structural differences in email and phone numbers can be used to induce a function. In various embodiments, function node $F_0$ can be learned from analyzing face image data annotated with labels.

Figure 6:
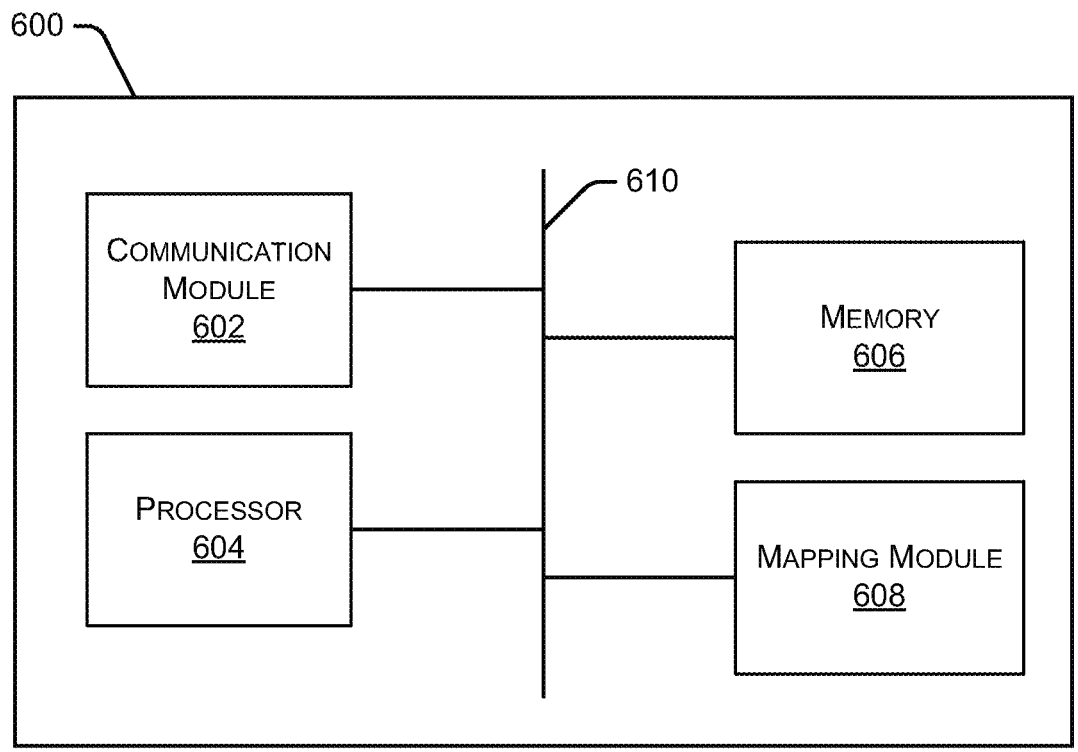
FIG. 6 is a block diagram depicting an embodiment of a computing device configured to implement systems and methods in accordance with the present disclosure.

Turning back in the drawings, FIG. 6 illustrates an example computing device 600 configured to implement systems and methods in accordance with the present disclosure.

Computing device 600 performs various functions related to the operation of back-end device 102, as discussed herein. In some embodiments, back-end device 102 includes multiple ones of computing device 600 that cooperatively implement the functions described herein. Computing device 600 includes a communication module 602, a processor 604, and a memory 606. Communication module 602 allows computing device 600 to communicate with other systems, such as communication networks, other servers, front-end device 104, etc. In some embodiments, computing device 600 includes more than one processor 604. For simplicity, however, the description hereinafter refers to the example in which computing device 600 includes one processor 604.

Processor 604 executes one or more sets instructions to implement the functionality provided by computing device 600. Memory 606 stores those one or more sets of instructions executable by processor 604 as well as other data used by processor 604 and other modules contained in computing device 600. Computing device 600 also includes a mapping module 608, which maps in-store transactions to customer profiles as described herein. For illustrative purposes, mapping module 608 is shown in FIG. 6 as an individual module separate from processor 604. In some implementations, however, mapping module 608 may be an integral part of processor 604. A data communication bus 610 allows the various modules and components of computing device 600 to communicate with each other.

Memory 606 may store data and one or more sets of instructions. Processor 604 may execute the one or more sets of instructions and control communication module 602 and mapping module 608. Processor 604 may, alone or in conjunction with mapping module 608, carry out processes 700 and 800, as described below, and any variations thereof.

For example, processor 604 may control mapping module 608 to receive, e.g., from database 108, information of a number of customer profiles of a number of online customers. Each of the customer profiles may include a number of attributes associated with a respective one of the online customers. The attributes may include an identifier of a traceable tender. Processor 604 may also receive information of a number of in-store transactions by a number of in-store customers. The information of each of the in-store transactions may include an identifier of a traceable tender used by the respective in-store customer in one or more in-store purchases. For at least one of the in-store customers, processor 604 may map one or more of the customer profiles of online customers to the at least one of the in-store customers by matching the identifier of the traceable tender associated with the at least one of the in-store customers to the respective identifier of a traceable tender associated with each of the one or more of the customer profiles.

As another example, processor 604 may receive, e.g., from database 108, information of a number of customer profiles of a number of online customers. Each of the customer profiles may include a number of types of attributes associated with a respective one of the online customers. The types of attributes may include a first type of attribute. Processor 604 may also receive information of a number of in-store transactions by a number of in-store customers. The information of each of the in-store transactions may include the first type of attribute associated with the respective in-store customer. Processor 604 may further map, for at least one of the in-store customers, one or more of the customer profiles of online customers to the at least one of the in-store customers based at least in part on the first type of attribute.

As yet another example, processor 604 may access a database, e.g., database 108, to obtain information of a number of customer profiles of a number of online customers. Each of the customer profiles may include a number of types of attributes associated with a respective one of the online customers. The types of attributes may include a first type of attribute. Processor 604 may also receive information of a first in-store transaction by a first in-store customer. The information of the first in-store transaction may include the first type of attribute associated with the first in-store customer. Processor 604 may further map one or more of the customer profiles of online customers to the first in-store customer based at least in part on the first type of attribute.

Figure 7:
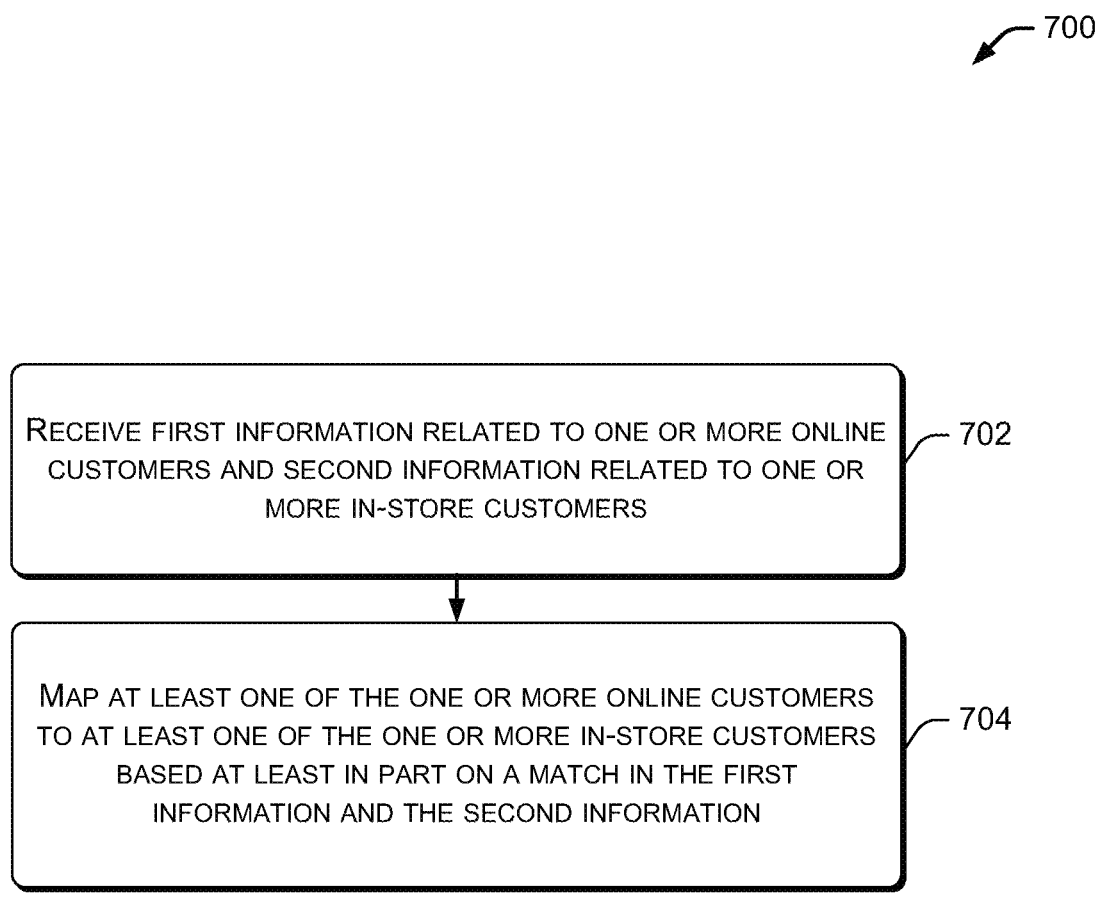
FIG. 7 is a flowchart diagram of an embodiment of a process in accordance with the present disclosure.

FIG. 7 illustrates an example process 700 for clustering of customers using transaction patterns. Example process 700 includes one or more operations, actions, or functions as illustrated by one or more of blocks 702 and 704. Although illustrated as discrete blocks, various blocks may be divided into additional blocks, combined into fewer blocks, or eliminated, depending on the desired implementation. Process 700 may be implemented by one or more processors including, for example, one or more processors of back-end device 102 and processor 604 of computing device 600. Moreover, some or all of the operations of process 700 may be carried out by mapping module 608 under the control of processor 604. For illustrative purposes, the operations described below are performed by one or more processors of computing device 600 as shown in FIG. 6.

At 702, processor 604 of computing device 600 may receive first information related to one or more online customers and second information related to one or more in-store customers. In one embodiment, the first information may include information of customer profiles of the one or more online customers. Each of the customer profiles may include a number of types of attributes including a first type of attribute. In one embodiment, the second information may include information of in-store transactions by the one or more in-store customers. The information of each of the in-store transactions may include the first type of attribute of the types of attributes.

At 704, processor 604 of computing device 600 may map at least one of the one or more online customers to at least one of the one or more in-store customers based at least in part on a match in the first information and the second information. In one embodiment, the processor 604 may map at least one of the one or more online customers to at least one of the one or more in-store customers based on a match in the first type of attribute.

To illustrate, consider an example where user 106 queries back-end device 102 to map in-store transactions to customer profiles. In this example, processor 604 of computing device 600 can retrieve, from database 108, information of a number of customer profiles of a number of online customers. Processor 604 also receives information of a number of in-store transactions by a number of in-store customers. Then, processor 604 maps one or more of the customer profiles of online customers to at least one of the in-store customers based at least in part on the first type of attribute. The results of mapping can thus be displayed to user 106 via front-end device 104.

In one embodiment, the types of attributes associated with each of the customer profiles may include a last name, a first name, an address, and one or more identifiers of one or more traceable tenders.

In one embodiment, the first type of attribute may include the one or more identifiers of one or more traceable tenders.

In one embodiment, each of the one or more traceable tenders may be a credit card or a debit card.

In one embodiment, when performing the mapping operation, processor 604 of computing device 600 may map the one or more of the customer profiles of online customers to the at least one of the in-store customers by matching the first type of attribute associated with the at least one of the in-store customers to the respective first type of attribute associated with each of the one or more of the customer profiles.

Alternatively or additionally, when performing the mapping operation, processor 604 of computing device 600 may map the one or more of the customer profiles of online customers to the at least one of the in-store customers based at least in part on the first type of attribute using probabilistic inference.

Alternatively or additionally, when performing the mapping operation, processor 604 of computing device 600 may map more than one of the customer profiles of online customers to the at least one of the in-store customers based at least in part on the first type of attribute using weights associated with the more than one of the customer profiles. The weights may be determined, e.g., by processor 604 of computing device 600, based on one or more similarities between the types of attributes associated with the more than one of the customer profiles.

In one embodiment, process 700 may include additional operations as follows. Processor 604 of computing device 600 may receive information indicating that a first in-store transaction and a second in-store transaction of the in-store transactions are related. Moreover, processor 604 of computing device 600 may further perform either of: (1) mapping at least one of the customer profiles mapped to a first in-store customer associated with the first in-store transaction to a second in-store customer associated with the second in-store transaction; or (2) mapping at least one of the customer profiles mapped to the second in-store customer associated with the second in-store transaction to the first in-store customer associated with the first in-store transaction.

In another embodiment, process 700 may include additional operations as follows. Processor 604 of computing device 600 may identify one or more similarities between one or more of the types of attributes associated with a first customer profile of the customer profiles and corresponding one or more of the types of attributes associated with at least a second customer profile of the customer profiles. Furthermore, processor 604 of computing device 600 may annotate the first and the second customer profiles to indicate that online customers associated with the first and the second customer profiles are related.

In yet another embodiment, process 700 may include additional operations as follows: Processor 604 of computing device 600 may receive, from a point of sale, first information related to a first in-store customer of the in-store customers. Processor 604 of computing device 600 may then identify one or more similarities between a second type of attribute in the first information and the second type of attribute associated with at least one customer profile of the customer profiles. Processor 604 of computing device 600 may further map the at least one customer profile of the customer profiles to the first in-store customer responsive to the identifying.

In one embodiment, the second type of attribute may be biometric information.

In one embodiment, according to process 700, processor 604 of computing device 600 may establish a graphical model that represents the received first and second information and one or more correlations between the one or more online customers and the one or more in-store customers. The graphical model may include variable nodes representative of the one or more online customers and the one or more in-store customers. The graphical model may further include functional nodes representative of at least a type of attribute associated with the one or more online customers and the one or more in-store customers. According to the graphical model, there is a match between a first online customer of the one or more online customers and a first in-store customer of the one or more in-store customers when at least one of the functional nodes is connected to the first online customer and the first in-store customer.

In one embodiment, according to process 700, processor 604 of computing device 600 may further receive additional information related to the one or more online customers and the one or more in-store customers. Processor 604 may then expand the graphical model using the additional information.

In one embodiment, the additional information may include information received from a social media (e.g., Facebook, MySpace, Twitter and the like), a third-party data provider (e.g., credit reporting agencies such as Experian, Equifax, Transunion, etc.), or both types of sources.

Figure 8:
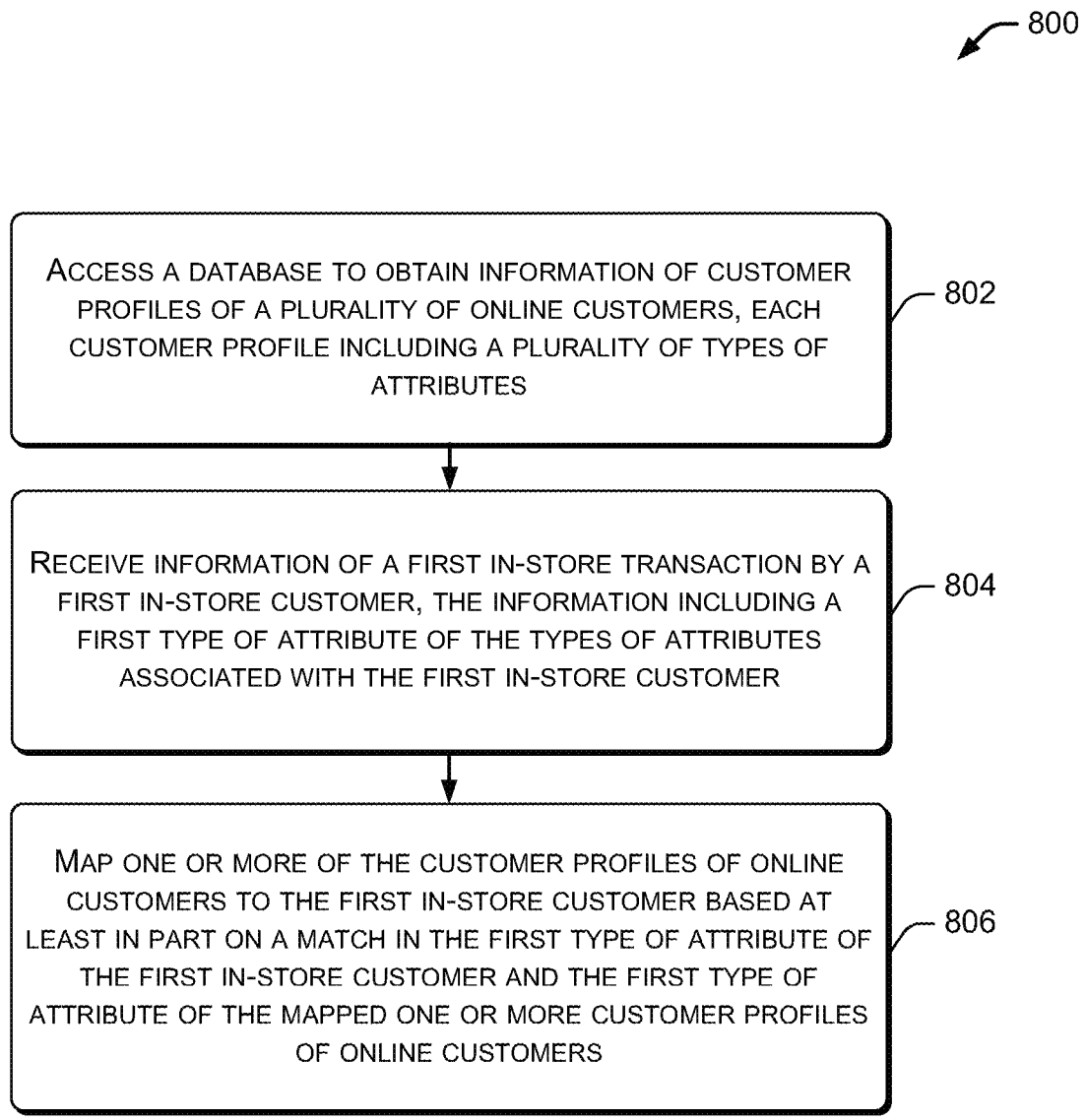
FIG. 8 is a flowchart diagram of another embodiment of a process in accordance with the present disclosure.

FIG. 8 illustrates an example process 800 for clustering of customers using transaction patterns. Example process 800 includes one or more operations, actions, or functions as illustrated by one or more of blocks 802, 804 and 806. Although illustrated as discrete blocks, various blocks may be divided into additional blocks, combined into fewer blocks, or eliminated, depending on the desired implementation. Process 800 may be implemented by one or more processors including, for example, one or more processors of back-end device 102 and processor 604 of computing device 600. Moreover, some or all of the operations of process 800 may be carried out by mapping module 608 under the control of processor 604. For illustrative purposes, the operations described below are performed by processor 604 of computing device 600 as shown in FIG. 6.

At 802, processor 604 of computing device 600 may access a database, e.g., database 108, to obtain information of a number of customer profiles of a number of online customers. Each of the customer profiles may include a number of types of attributes associated with a respective one of the online customers. The types of attributes may include a first type of attribute.

At 804, processor 604 of computing device 600 may receive information of a first in-store transaction by a first in-store customer. The information of the first in-store transaction may include the first type of attribute associated with the first in-store customer.

At 806, processor 604 of computing device 600 may map one or more of the customer profiles of online customers to the first in-store customer based at least in part on a match in the first type of attribute of the first in-store customer and the first type of attribute of the mapped one or more customer profiles of online customers.

As an example, processor 604 of computing device 600 can access database 108 to obtain information of a number of customer profiles of a number of online customers. Processor 604 then receives information of a first in-store transaction by a first in-store customer. Next, processor 604 maps one or more of the customer profiles of online customers to the first in-store customer based at least in part on the first type of attribute. The results of mapping can thus be displayed to user 106 via front-end device 104.

In one embodiment, the types of attributes associated with each of the customer profiles may include a last name, a first name, an address, and one or more identifiers of one or more traceable tenders. The first type of attribute may include the one or more identifiers of one or more traceable tenders.

In one embodiment, each of the one or more traceable tenders may be a credit card or a debit card.

In one embodiment, when mapping, processor 604 of computing device 600 may map the one or more of the customer profiles of online customers to the first in-store customer by matching the first type of attribute associated with the first in-store customer to the respective first type of attribute associated with each of the one or more of the customer profiles.

In one embodiment, when mapping, processor 604 of computing device 600 may map more than one of the customer profiles of online customers to the first in-store customer based at least in part on the first type of attribute using weights associated with the more than one of the customer profiles. The weights may be determined, e.g., by processor 604 of computing device 600, based on one or more similarities between the types of attributes associated with the more than one of the customer profiles.

In one embodiment, process 800 may include additional operations as follows. Processor 604 of computing device 600 may receive information indicating that the first in-store transaction and a second in-store transaction of the in-store transactions are related. Processor 604 of computing device 600 may further perform either of: (1) mapping at least one of the customer profiles mapped to the first in-store customer associated with the first in-store transaction to a second in-store customer associated with the second in-store transaction; or (2) mapping at least one of the customer profiles mapped to the second in-store customer associated with the second in-store transaction to the first in-store customer associated with the first in-store transaction.

In another embodiment, process 800 may include additional operations as follows. Processor 604 of computing device 600 may identify one or more similarities between one or more of the types of attributes associated with a first customer profile of the customer profiles and corresponding one or more of the types of attributes associated with at least a second customer profile of the customer profiles. Processor 604 of computing device 600 may further annotate the first and the second customer profiles to indicate that online customers associated with the first and the second customer profiles are related.

In yet another embodiment, process 800 may include additional operations as follows. Processor 604 of computing device 600 may receive, from a point of sale, first information related to a first in-store customer of the in-store customers. Processor 604 of computing device 600 may the identify one or more similarities between a second type of attribute in the first information and the second type of attribute associated with at least one customer profile of the customer profiles. Processor 604 of computing device 600 may further map the at least one customer profile of the customer profiles to the first in-store customer responsive to the identifying. The second type of attribute may be biometric information.

An example scenario in which an e-commerce customer forgets his login credentials for a particular e-commerce website and creates a new account for that e-commerce website is described below. The sequence of events are listed in chronological order as follows:

An e-commerce customer John Doe (JD) creates a profile $C_1$ to access an e-commerce website.

JD buys a 3-D flat screen TV using profile $C_1$.

Targeting engine of the e-commerce website selects $C_1$ as a candidate for buying a blu-ray player.

JD forgets the credentials (e.g., user name and/or password) associated with $C_1$ and creates a new profile $C_2$ to access the same e-commerce web site.

JD buys a blu-ray player using profile $C_2$.

Targeting engine of the e-commerce website continues to target $C_1$ for blu-ray player and, additionally, selects $C_2$ as a candidate for buying a 3-D flat screen TV.

As is evident from the above example scenario, it is desirable for the targeting engine, operated by the e-commerce merchant that maintains the e-commerce website, to be aware of the duplicate profiles $C_1$ and $C_2$ that are associated with the same e-commerce customer JD. Furthermore, under such circumstances a recommendation engine, also operated by the e-commerce merchant that maintains the e-commerce website, may be unable to learn certain item-to-item relationship and item-to-user relationship, e.g., the 3-D flat screen TV and the blu-ray player are purchased by the same e-commerce customer. Clearly, such situation is undesirable in terms of monetization from the perspective of the e-commerce merchant as well as in terms of user experience from the perspective of the e-commerce customer.

The proposed systems, methods, algorithms and techniques described herein address the above-described problem by clustering or grouping e-commerce customers into different classifications based on certain patterns in their transactions. In a nutshell, a proposed algorithm of the present disclosure identifies a set of customers who use the same payment option, or traceable tender, under more than one customer identification, and distill the set of customers to find two groups of customer identifications: one group of customer identifications that are mapped to a same individual customer and another group of customer identifications that are mapped to customers who are related to each other, e.g., belonging to the same household. It is assumed that each e-commerce customer has created secure credentials (e.g., user name, password, payment option that includes at least one traceable tender, personal information such as first name, last name, mailing address, etc.) to access and conduct transactions on a given e-commerce website.

Figure 9:
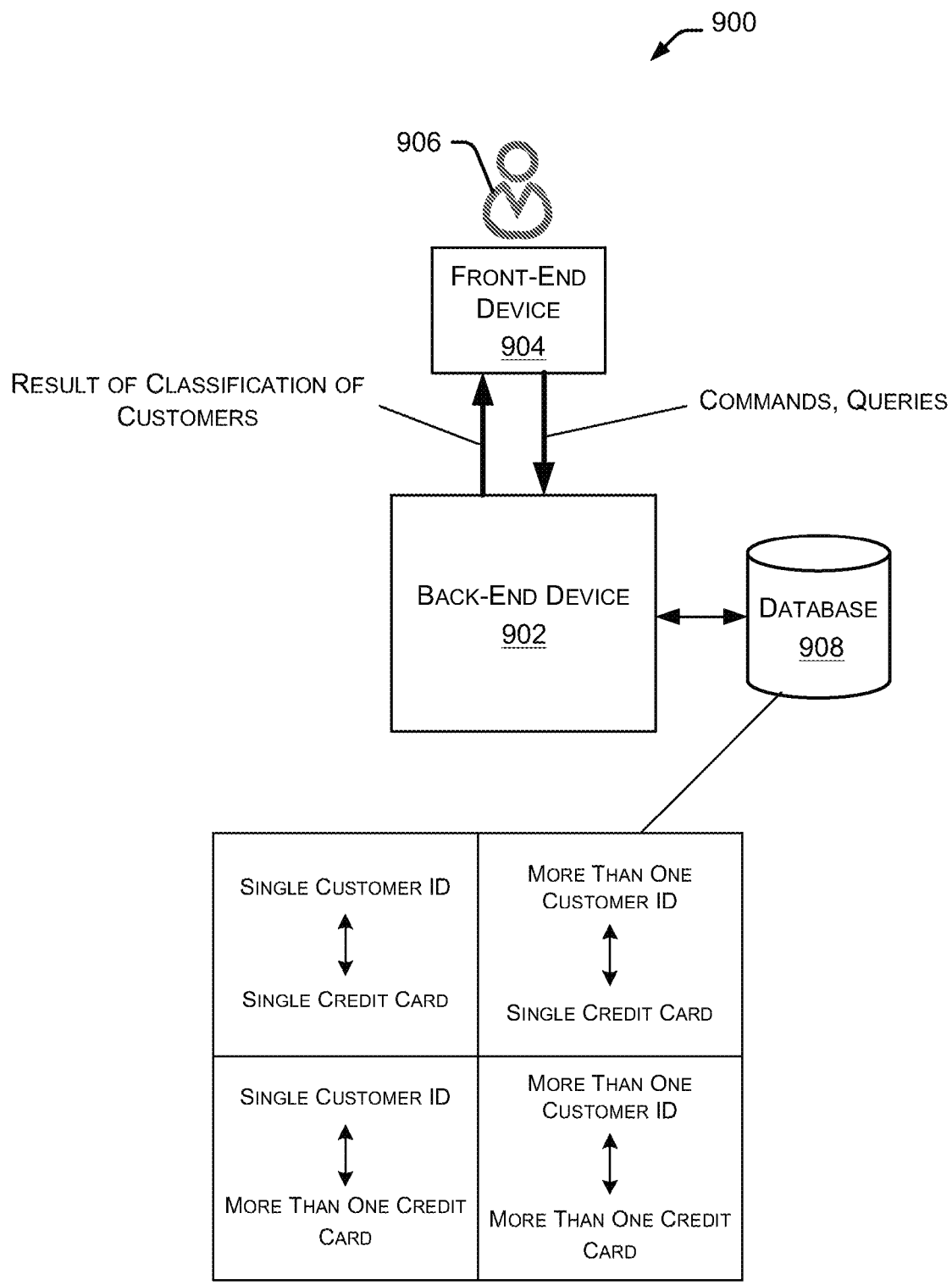
FIG. 9 is a block diagram depicting an example framework of the present disclosure.
Figure 10:
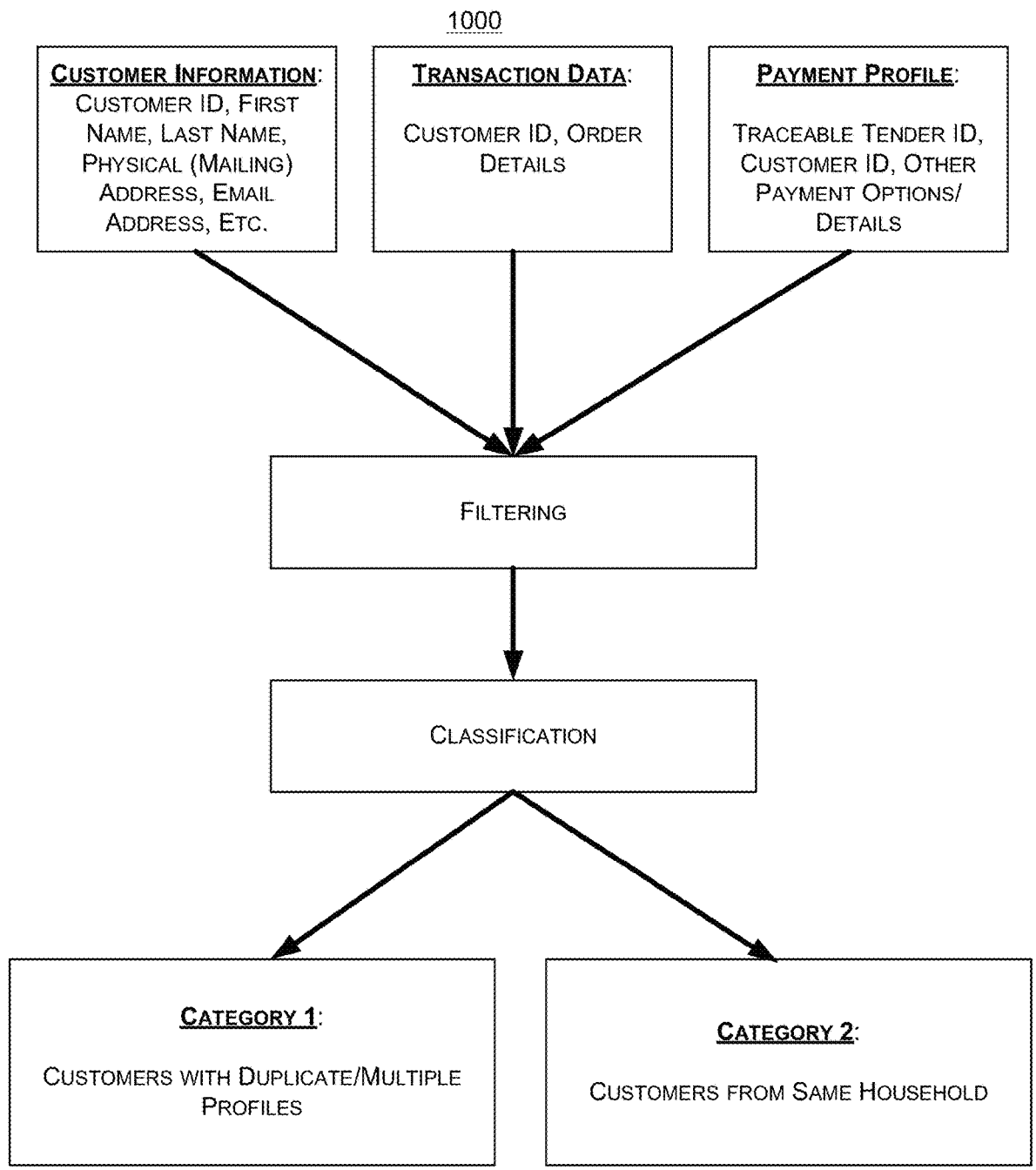
FIG. 10 is a block diagram depicting an example algorithm implemented in systems and methods of the present disclosure.

FIG. 9 illustrates an example framework 900 of the present disclosure. FIG. 10 illustrates an example algorithm 1000 implemented in systems and methods of the present disclosure. The description below refers to FIG. 9 and FIG. 10. In various embodiments, framework 900 can be similar or identical to framework 100, and each framework can be used interchangeably or otherwise modified. In some embodiments, framework 900 can be a variant of framework 100 (FIG. 1).

Framework 900 includes back-end device 902 and front-end device 904. Back-end device 902 may include one or more processors that execute operations pertaining to algorithms described in the present disclosure. In these or other embodiments, the back-end device 902 can be similar or identical to back-end device 102 (FIG. 2). Optionally, database 908 may be communicatively coupled to back-end device 902 to cache or otherwise store some or all of the information and data received, collected and processed by the one or more processors of back-end device 902. In some implementations, database 908 may be an integral part of back-end device 902. Back-end device 902 may be any type of computing device such as, for example, one or more of a desktop computer, a workstation, a server, a mainframe computer, a portable device, etc. Front-end device 904 may be any type of user-interface device including, for example, a combination of one or more of a display panel, a monitor, a keyboard, a computer mouse, a stylus, a keypad, a touch-sensing screen, a voice-command device, or any suitable user-interface device conceivable in the future. Alternatively, front-end device 904 may be any type of computing device such as, for example, a desktop computer, a workstation, a laptop computer, a notebook computer, a tablet, a smartphone, a personal digital assistant, or any suitable handheld device. In many embodiments, the front-end device 904 can be similar or identical to the front-end device 104 (FIG. 1).

Back-end device 902 and front-end device 904 may be integral parts of an apparatus or, alternatively, may be communicatively coupled directly or indirectly through one or more communication devices or one or more networks. In implementations where back-end device 902 and front-end device 904 communicate with one another through one or more networks, the one or more networks may include, for example, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN) or the Internet. In implementations where back-end device 902 and front-end device 904 communicate with one another through one or more networks including at least one wireless network, the at least one wireless network may be, for example, based on one or more wireless standards such as IEEE 802.11 standards, WiFi, Bluetooth, infrared, WiMax, 2G, 2.5G, 3G, 4G, Long Term Evolution (LTE) and/or future versions and/or derivatives thereof.

User 906, an operator of an e-commerce website, operates front-end device 904 to access back-end device 902. In some embodiments, the user 906 can be similar or identical to user 106 (FIG. 1). For example, through front-end device 904, user 906 sends commands and/or queries to back-end device 902 to view classification of customers of the respective e-commerce website. In response, back-end device 902 provides a result of classification of customers showing the customers of the e-commerce website being clustered or grouped into various groups. For instance, as shown in FIG. 9, the customers are clustered into four groups in terms of customer identifications, namely: a single customer identification associated with a single credit card, more than one customer identification associated with a single credit card, a single customer identification associated with more than on credit card, and more than one customer identification associated with more than one credit card. Those with ordinary skill in the art would appreciate that although the example of FIG. 9 shows credit card as the payment option, or traceable tender, in other examples and actual implementations additional or alternative payment option/traceable tender(s) may be used. Other payment options may include, for example, check, bank account and another form of traceable tender.

Database 908 maintains a database of customer identifications and payment options as associated with a number of customers, well relationships between the customer identifications and the payment options. In several embodiments, the database 908 can be similar to identical to database 108

(FIG. 1). As shown in FIG. 9, possible relationships between the customer identifications associated with the customers and the payment options associated with the customers include the following: a single customer identification associated with a single credit card, more than one customer identification associated with a single credit card, a single customer identification associated with more than on credit card, and more than one customer identification associated with more than one credit card.

Among the four groups, the group related to more than one customer identification associated with a single credit card is of particular interest. More specifically, the proposed algorithm, as shown in FIG. 10, classifies those customers into two categories: category 1—individual customers with multiple customer identifications, and category 2—multiple customers of the same household. With respect to category 1, a single payment option, e.g., credit card, may be attributed to multiple customer identifications pertaining to the same underlying customer, especially when the customer forgets the credentials to login to the e-commerce website and subsequently creates a new set of credentials. Under this situation, there is no requirement on the customer to use a new payment option and, hence, the same payment option, e.g., credit card, is associated with multiple customer identifications that belong to the same individual customer. This is the case illustrated in the example of John Doe described above. With respect to category 2, a single payment option, e.g., credit card, may be attributed to multiple customer identifications pertaining to customers from the same household. For example, spouses may have different login credentials but share the same credit card and such an analogy applies to parents/children and other members of the household. Exploiting similarities in last names and physical (mailing) address is a way to shed more light on this case.

Referring to FIG. 10, input to the algorithm of the present disclosure includes a list of customers who used the same payment option, e.g., credit card. More specifically, each record in the data set 1) has a variable length and corresponds to the set of customer identifications that used a particular payment option, along with additional information such as first and last names, physical address, email address and other relevant information. Also, depending on the actual implementation, the algorithm may be adjusted to bias towards customers who have valid traceable tender information on profile and/or customers with some recent activity, etc. The algorithm filters the input information and classifies customers into categories, e.g., category 1 and category 2 as shown in the example depicted in FIG. 10.

Let $D=\{D_i\}$, $=1, 2, \ldots N$, where $D_i$ denotes a collection of profiles pertaining to customers who used a particular payment option $t_i$, and N denotes a number of records in the data set. Each record $D_k$ may be expressed as $\{t_k, c^1_k, c^2_k, \ldots\}$ where $D_k$ includes $t_k$ a unique identification generated from the payment option, e.g., credit card, and $c^j_k$ represents the jth customer profile that used $t_k$.

In one approach to validate whether the set of customers in a given record $D_k$ belongs to category 1, the algorithm may determine similarities in the customer profiles $\{c^j_k\}$, $j=1, 2, \ldots n_k$, quantify such similarities (or dissimilarities) and filter the similarity (or dissimilarity) using a similarity score which may be an application-dependent threshold. When a given record cannot be grouped into or classified as category 1, the algorithm tries to classify it as a household, or category 2. In this case the algorithm may look for similarity in fewer dimensions of the customer profile data such as, for example, last name and physical address. The operation depends on a threshold that is application-dependent. Spouse and family members with different last names and living in the same address may still be clustered or classified into a household but with a lower probability because of the edit distance penalty incurred for name mismatch. Likewise, in cases where last names are similar but addresses are different, e.g., children in college away from home while parents are at home, the probability of the affected customers belonging to the same household may tend to be lower.

As alluded to above, edit distance is used as a metric that defines similarity between two strings (e.g., between last name, first name, etc.), and edit distance is the number of insertions, deletions and/or substitutions required to transform one string to another. In the algorithm of the present disclosure, edit distance is applied on the first and last names between all pairs of customer profiles in a record (i.e., all customers who shared a given payment option). If a given record $D_k$ has $n_k$ profiles in it, then the set of possible distances between all pairs of last names can be succinctly represented by a matrix $[L_t(i,j)]$, $i=1, 2, \ldots n_k$, where $j=1, 2, n_k$. The same expression may be obtained for first names by $[F_t(i,j)]$.

The algorithm filters for payment options, which may be any form of traceable tender, that are attributed to multiple customer identifications. Additionally, the algorithm may further filter for customer identifications with recent transaction history. In one embodiment, the algorithm filters records by applying a threshold on $[L_t+F_t]$, by ensuring that all values in the matrix are below a predefined threshold. For example, a threshold of 3 may be used to generate the initial results. If all the pairwise edit distances fall below a preset threshold, then all profiles in the line are grouped to one profile and a new customer identification may be generated for the group. The threshold used for this purpose is application-dependent. The lower the threshold the higher the confidence there is, and vice versa.

Let $I_t^{ij}$ be a binary random variable that denotes whether two customers $c_t^i$ and $c_t^j$ in record $D_t$ belong to category 1 ($I_t^{ij}=1$) or otherwise. The posterior probability $P(I_t^{ij}|c_t^i,c_t^j)$ is then calculated. A logistic regression model may be used to represent the posterior distribution for grouping customers as probabilistic inference or matching:

$$P(I_t^{ij} = 1 \mid c_t^i, c_t^j) = \frac{1}{1 + e^{-wx}} \quad (4)$$

In the above equation, equation 4, x is a vector representing features derived from customer profiles in $c^i_t$ and $c^j_t$. $L_t(i,j)$ and $F_t(i,j)$ are used as features for evaluating the posterior. The weights w of the logistic regressor may be readily learned from labeled training data. The set of features used to trigger the logistic regressor may include other form(s) of information such as physical address and email address match, features that depend on transaction patterns (e.g., frequent versus occasional shopping), affinity to brands, category of items purchased, etc. One advantage is that the weights may be estimated automatically from data.

Thus, in summary, the algorithm of the present disclosure receives customer information that includes at least a plurality of customer identifications and a plurality of payment options associated with a plurality of customers. The algorithm identifies a subset of payment options, from among the payment options, and a subset of customer identifications, from among the customer identifications, such that each payment option of the subset of payment options is associated with more than one customer identification of the subset of customer identifications. The algorithm then classifies each customer identification of the subset of customer identifications as either of one of more than one of the customer identifications associated with a single one of the customers or one of more than one of the customer identifications associated with more than one of the customers who are related to each other.

Figure 11:
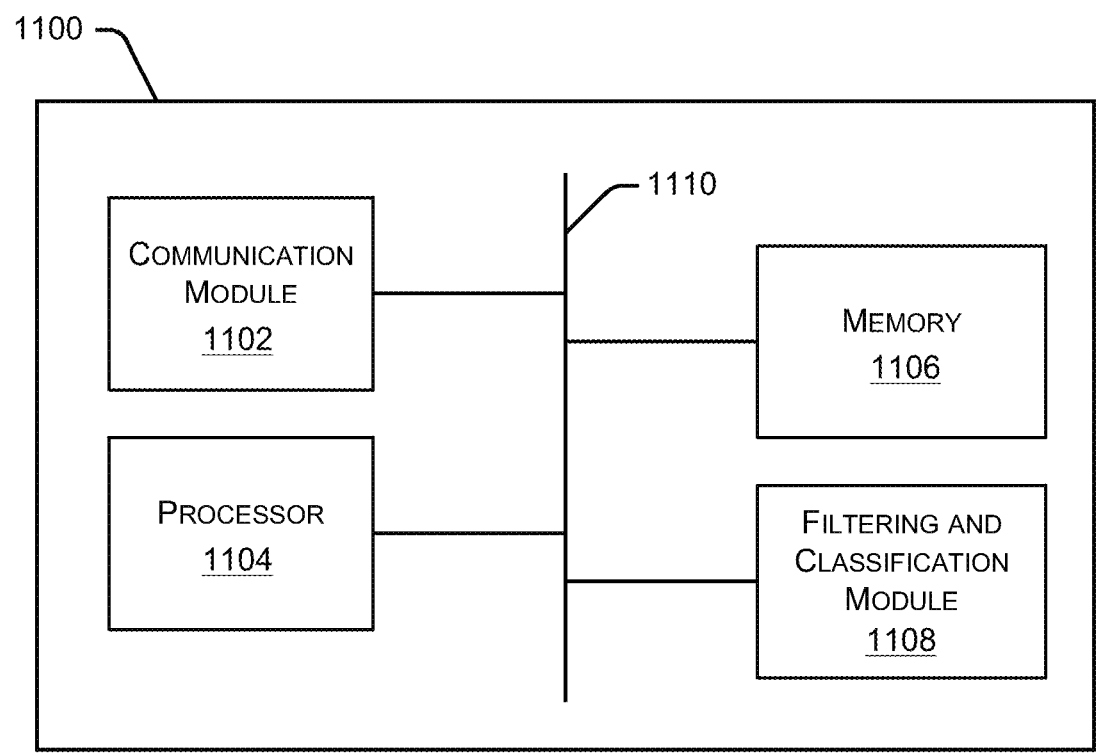
FIG. 11 is a block diagram depicting an embodiment of a computing device configured to implement systems and methods of the present disclosure.

FIG. 11 illustrates an example computing device 1100 configured to implement systems and methods of the present disclosure. Computing device 1100 can be similar or identical to computing device 600 (FIG. 6) as each element in computing device 1100 can be interchangeably switched and/or used in computing device 600 (FIG. 6). Further, mapping module 608 (FIG. 6) and filtering and classification module 1108 can be interchangeably implemented in either or both computing device 1100 and/or computing device 600 (FIG. 6). Further computing device 1100 can be a variant of computing device 600 (FIG. 6). Specifically, each element of computing device 1100 including communication module 1102, processor 1104, memory 1106, and/or data bus 1110 can be similar or identical to each element of computing device 600 (FIG. 6) including communication device 602 (FIG. 6), processor 604 (FIG. 6), memory device 606 (FIG. 6), and/or data bus 610 (FIG. 6).

Computing device 1100 performs various functions related to the operation of back-end device 902, as discussed herein. In some embodiments, back-end device 902 includes multiple ones of computing device 1100 that cooperatively implement the functions described herein. Computing device 1100 includes a communication module 1102, a processor 1104, and a memory 1106. Communication module 1102 allows computing device 1100 to communicate with other systems, such as communication networks, other servers, front-end device 904, etc. In many embodiments, communication module 1102 can be similar or identical to communication module 602 (FIG. 6). In some embodiments, computing device 1100 includes more than one processor 1104. For simplicity, however, the description hereinafter refers to the example in which computing device 1100 includes one processor 1104.

Processor 1104 executes one or more sets instructions to implement the functionality provided by computing device 1100. Further, processor 1104 can be similar or identical to processor 604 (FIG. 6). Memory 1106 stores those one or more sets of instructions executable by processor 1104 as well as other data used by processor 1104 and other modules contained in computing device 1100. Memory 1106 can be similar or identical to memory 606 (FIG. 6). Computing device 1100 also includes a filtering and classification module 1108, which filters and classifies customers as described herein. Filtering and classification module 1108 can be used interchangeably in either or both computing device 600 (FIG. 6) and/or computing device 1100. Computing device 1100 also can include mapping module 608 (FIG. 6). For illustrative purposes, filtering and classification module 1108 is shown in FIG. 11 as an individual module separate from processor 1104. In some implementations, however, filtering and classification module 1108 may be an integral part of processor 1104. A data communication bus 1110 allows the various systems and components of computing device 1100 to communicate with each other. Further, data communication bus 1110 can be similar or identical to data communication bus 610 (FIG. 6).

Memory 1106 may store data and one or more sets of instructions, and processor 1104 may execute the one or more sets of instructions and control communication module 1102 and filtering and classification module 1108. For example, processor 1104 may control filtering and classification module 1108 to receive, e.g., from database 908, customer information that includes at least a number of customer identifications and a number of payment options associated with a number of customers. Processor 1104 may also control filtering and classification module 1108 to identify a subset of payment options, from among the payment options, and a subset of customer identifications, from among the customer identifications, such that each payment option of the subset of payment options is associated with more than one customer identification of the subset of customer identifications. Processor 1104 may further control filtering and classification module 1108 to classifying each customer identification of the subset of customer identifications as either of one of more than one of the customer identifications associated with a single one of the customers or one of more than one of the customer identifications associated with more than one of the customers who are related to each other.

As another example, processor 1104 may control filtering and classification module 1108 to receive, e.g., from database 908, customer information that includes at least a number of customer identifications and a number of payment options associated with a number of customers. Processor 1104 may also control filtering and classification module 1108 to identify a subset of payment options, from among the payment options, such that each payment option of the subset of payment options is associated with more than one of the customer identifications. Processor 1104 may further control filtering and classification module 1108 to classifying each payment option of the subset of payment options as being associated with either a single one of the customers or more than one of the customers who are related to each other.

As yet another example, processor 1104 may identify a subset of payment options from among a number of payment options associated with a number of customers. Processor 1104 may also identify a subset of customer identifications from among a number of customer identifications associated with the number of customers such that each payment option of the subset of payment options is associated with more than one customer identification of the subset of customer identifications. Processor 1104 may further classify each customer identification of the subset of customer identifications as either of one of more than one of the customer identifications associated with a single one of the customers or one of more than one of the customer identifications associated with more than one of the customers who are related to each other.

Figure 12:
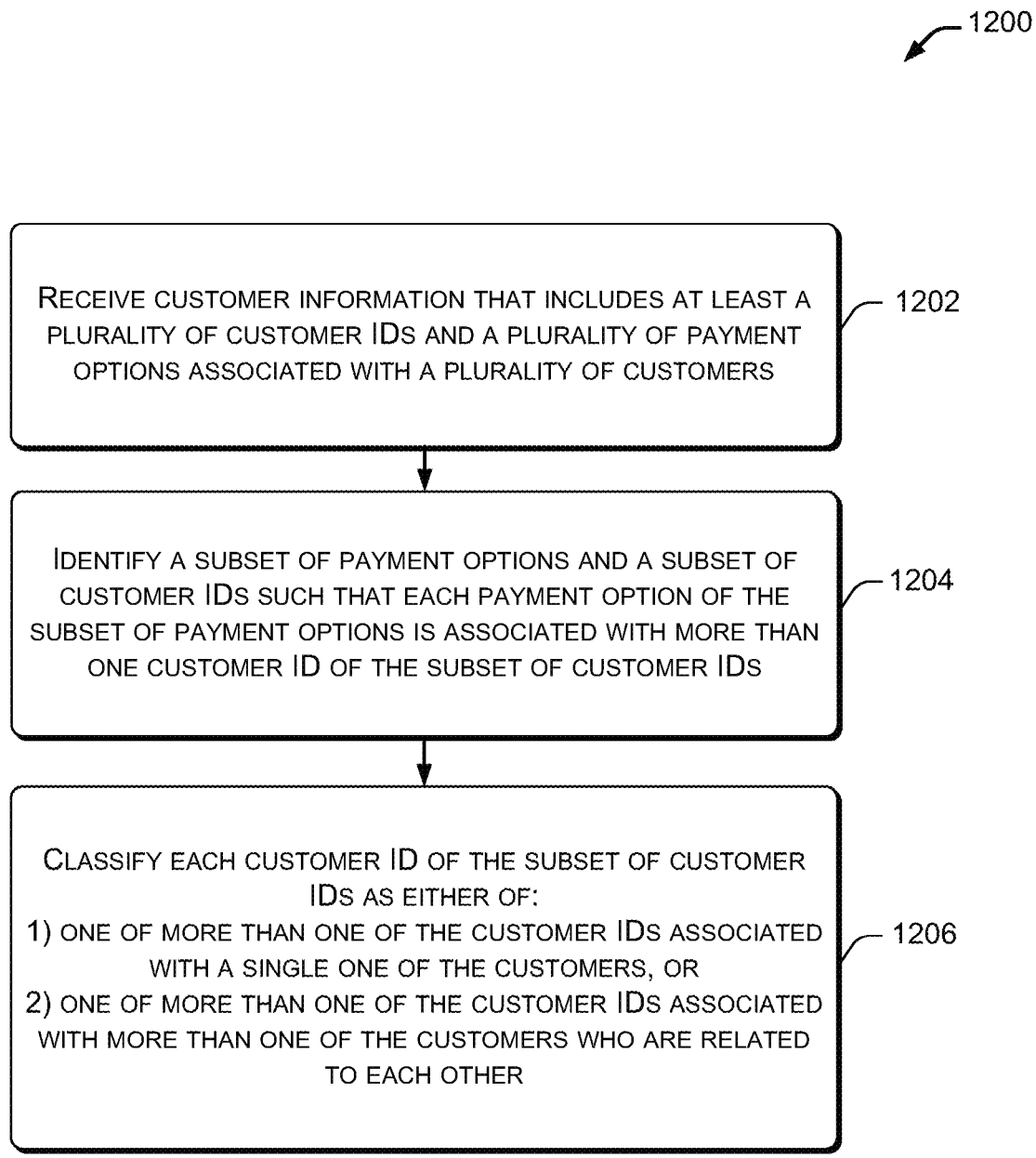
FIG. 12 is a flowchart diagram of an embodiment of a process of the present disclosure.

FIG. 12 illustrates an example process 1200 for clustering of customers using transaction patterns. Example process 1200 includes one or more operations, actions, or functions as illustrated by one or more of blocks 1202, 1204 and 1206. Although illustrated as discrete blocks, various blocks may be divided into additional blocks, combined into fewer blocks, or eliminated, depending on the desired implementation. Process 1200 may be implemented by one or more processors including, for example, one or more processors of back-end device 902 and processor 1104 of computing device 1100. Moreover, some or all of the operations of process 1200 may be carried out by filtering and classification module 1108 under the control of processor 1104. For illustrative purposes, the operations described below are performed by one or more processors of computing device 1100 as shown in FIG. 11.

At 1202, processor 1104 of computing device 1100 may receive, e.g., from database 1108, customer information that includes at least a plurality of customer identifications and a plurality of payment options associated with a plurality of customers.

At 1204, processor 1104 of computing device 1100 may identify a subset of payment options, from among the payment options, and a subset of customer identifications, from among the customer identifications, such that each payment option of the subset of payment options is associated with more than one customer identification of the subset of customer identifications.

At 1206, processor 1104 of computing device 1100 may classify each customer identification of the subset of customer identifications as either one of more than one of the customer identifications associated with a single one of the customers or one of more than one of the customer identifications associated with more than one of the customers who are related to each other.

To illustrate, consider an example where user 906 queries back-end device 902 to cluster e-commerce customers of the e-commerce website. In this example, processor 1104 of computing device 1100 can retrieve customer information form database 908, identify customer identifications and payment options, e.g., credit cards, where each of the identified payment option is associated with more than one customer identification. Processor 1104 then filters the customer information and classifies those customers associated with the identified customer identifications into two categories: those customers each of whom is associated with more than one customer identification, and those customers each of whom is a member of a household that use the same payment option.

In one embodiment, for each of the customers, the customer information further includes a first name, a last name, a physical address, an email address, one or more order details, one or more additional payment options, a transaction history, one or more preferences, or a combination thereof.

In one embodiment, in identifying the subset of payment options and the subset of customer identifications, processor 1104 of computing device 1100 may filter for one or more of the payment options associated with more than one of the customer identifications. Additionally, in one embodiment, processor 1104 of computing device 1100 may further filter for one or more customer identifications each of which having a recent transaction history.

In one embodiment, in classifying each customer identification of the subset of customer identifications, processor 1104 of computing device 1100 may determine a similarity score for each of the more than one customer identifications associated with the respective payment option for each payment option of the subset of payment options.

In one embodiment, the similarity score for each of the more than one customer identifications may be indicative of similarities between a string of one or more pieces of personal information associated with a respective one of the more than one customer identifications and a respective string of one or more pieces of personal information associated with each of one or more other of the more than one customer identifications. In one embodiment, the one or more pieces of personal information may include a first name, a last name, a physical address, an email address, or a combination thereof.

In one embodiment, in classifying each customer identification of the subset of customer identifications, processor 1104 of computing device 1100 may classify a first customer identification of the subset of customer identifications as one of more than one of the customer identifications associated with a first customer among the customers responsive to the similarity score associated with the first customer identification being greater than a first predefined threshold. Furthermore, the similarity score for each of the more than one customer identifications may be indicative of similarities in a first set of personal information between a respective one of the more than one customer identifications and each of one or more other of the more than one customer identifications. The first set of personal information may include, for example, a combination of two or more of a first name, a last name, a physical address, and an email address.

Additionally, in classifying each customer identification of the subset of customer identifications, processor 1104 of computing device 1100 may further classify a second customer identification of the subset of customer identifications as one of more than one of the customer identifications associated with more than one of the customers who are related to each other responsive to the similarity score associated with the second customer identification being greater than a second predefined threshold. Moreover, the similarity score for each of the more than one customer identifications may be indicative of similarities in a second set of personal information between a respective one of the more than one customer identifications and each of one or more other of the more than one customer identifications. In particular, a quantity of pieces of personal information in the second set is lower than a quantity of pieces of personal information in the first set. The second set of personal information may include, for example, a last name and a physical address.

In one embodiment, at least one of the payment options includes a credit card, a check, bank account, another form of traceable tender, or a combination thereof.

In one embodiment, process 1200 may further include displaying a result of the classifying, e.g., by processor 1104 of computing device 1100 causing front-end device 904 to display the result of classifying to user 906.

Figure 13:
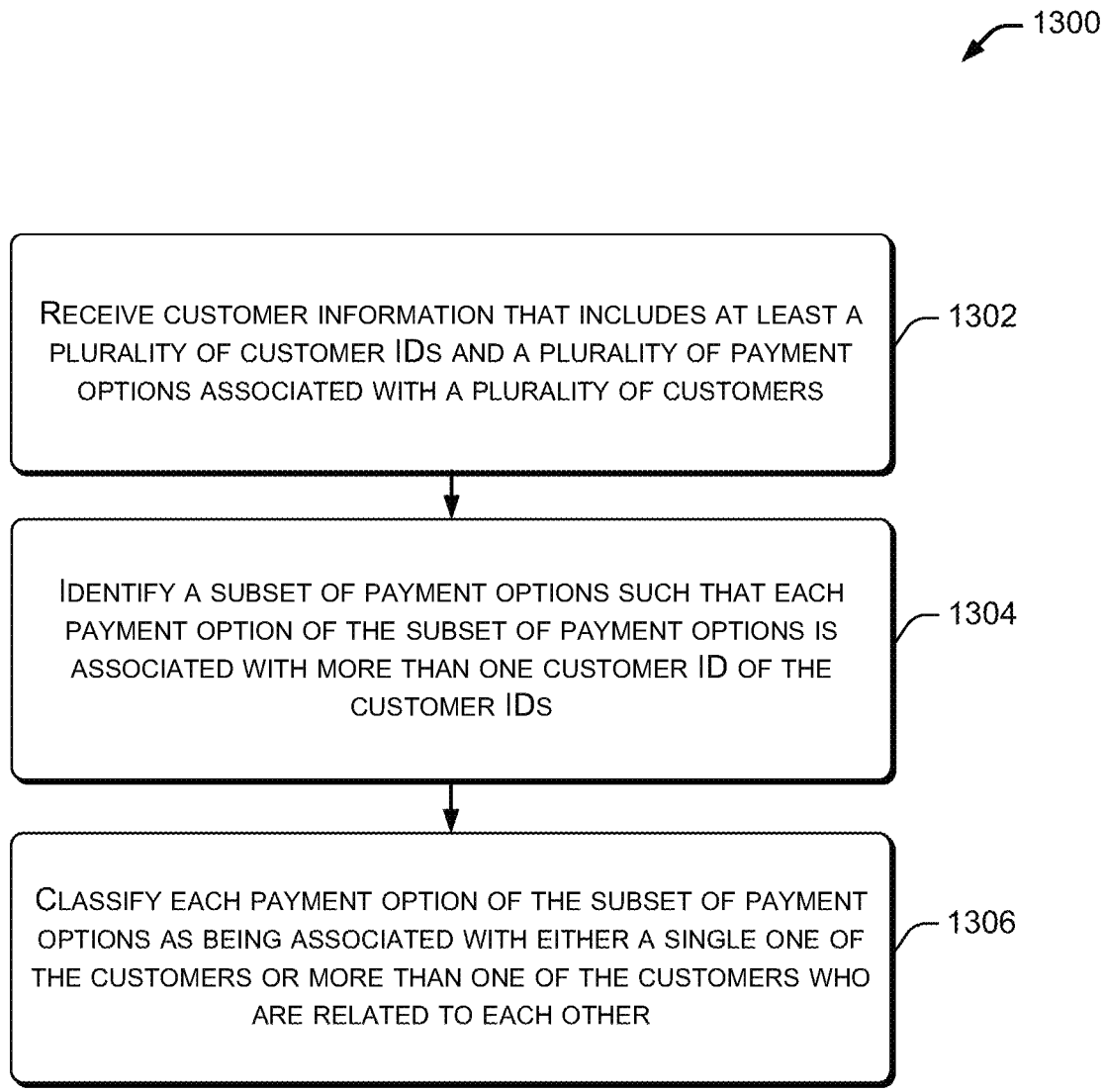
FIG. 13 is a flowchart diagram of another embodiment of a process of the present disclosure.

FIG. 13 illustrates an example process 1300 for clustering of customers using transaction patterns. Example process 1300 includes one or more operations, actions, or functions as illustrated by one or more of blocks 1302, 1304 and 1306. Although illustrated as discrete blocks, various blocks may be divided into additional blocks, combined into fewer blocks, or eliminated, depending on the desired implementation. Process 1300 may be implemented by one or more processors including, for example, one or more processors of back-end device 902 and processor 1104 of computing device 1100. Moreover, some or all of the operations of process 1300 may be carried out by filtering and classification module 1108 under the control of processor 1104. For illustrative purposes, the operations described below are performed by processor 1104 of computing device 1100 as shown in FIG. 11.

At 1302, processor 1104 of computing device 1100 may receive customer information that includes at least a plurality of customer identifications and a plurality of payment options associated with a plurality of customers.

At 1304, processor 1104 of computing device 1100 may identify a subset of payment options, from among the payment options, such that each payment option of the subset of payment options is associated with more than one of the customer identifications.

At 1306, processor 1104 of computing device 1100 may classify each payment option of the subset of payment options as being associated with either a single one of the customers or more than one of the customers who are related to each other.

As an example, processor 1104 of computing device 1100 can retrieve customer information form database 1108, identify customer identifications and payment options, e.g., credit cards, where each of the identified payment option is associated with more than one customer identification. Processor 1104 then filters the customer information and classifies those payment options into two categories: those payment options each of which is associated with a single customer, and those payment options each of which is more than one customer of a household that use the same payment option.

In one embodiment, in classifying each payment option of the subset of payment options as being associated with either a single one of the customers or more than one of the customers who are related to each other, processor 1104 of computing device may classify each of the customer identifications as either one of more than one of the customer identifications associated with a single one of the customers or one of more than one of the customer identifications associated with more than one of the customers who are related to each other.

In one embodiment, in classifying each payment option of the subset of payment options as being associated with either a single one of the customers or more than one of the customers who are related to each other, processor 1104 of computing device may determine a similarity score for each of the more than one customer identifications associated with the respective payment option for each payment option of the subset of payment options.

In one embodiment, the similarity score for each of the more than one customer identifications may be indicative of similarities between a string of one or more pieces of personal information associated with a respective one of the more than one customer identifications and a respective string of one or more pieces of personal information associated with each of one or more other of the more than one customer identifications.

In one embodiment, in determining a similarity score for each of the more than one customer identifications associated with the respective payment option, processor 1104 of computing device 1100 may determine a measure of edit distance between a string of one or more pieces of personal information associated with a respective one of the more than one customer identifications and a respective string of one or more pieces of personal information associated with each of one or more other of the more than one customer identifications.

In one embodiment, the measure of edit distance may relate to a number of insertions, deletions, substitutions, or a combination thereof, performed to transform a first string of one or more pieces of personal information associated with a first of the customer identifications to a second string of one or more pieces of personal information associated with a second of the customer identifications.

A number of embodiments include a system. The system can include one or more processors and one or more non-transitory memory storage devices storing computer instructions configured to run on the one or more processors and to perform multiple functions. The computer instructions can be configured to perform receiving one or more user identifications of one or more users and one or more payment options associated with multiple transactions. The computer instructions can also be configured to perform identifying the one or more user identifications associated with one or more user profiles. The computer instructions can additionally be configured to perform distilling a subset of payment options from among the one or more payment options, and a subset of user identifications from among the one or more user identifications, such that each payment option of the subset of payment options is associated with more than one user identification of the subset of user identifications. The computer instructions can be configured to perform analyzing the subset of payment options for patterns based on the subset of user identifications associated with a single payment option of the subset of payment options to cluster each user identification of the subset of user identifications into multiple classifications. A logistic regression algorithm can be used in determining a first classification comprising a single user of the one or more users mapped to more than one of the subset of user identifications. A logistic regression algorithm can also be used in determining a second classification comprising one or more first users of the one or more users mapped to the more than one user identification of the subset of user identifications, wherein the one or more first users are part of the same household. Responsive to receiving a query, the computer instructions can be configured to perform providing instructions to display a particular classification of the each user identification of the subset of user identifications at a computing device.

Various embodiments include a method. The method can include being implemented via execution of computing instructions configured to run at one or more processors and stored at one or more non-transitory computer-readable media. The method can include receiving one or more user identifications of one or more users and one or more payment options associated with multiple transactions. The method can also include identifying the one or more user identifications associated with one or more user profiles. The method can additionally include distilling a subset of payment options from among the one or more payment options, and a subset of user identifications from among the one or more user identifications, such that each payment option of the subset of payment options is associated with more than one user identification of the subset of user identifications. The method can further include analyzing the subset of payment options for patterns based on the subset of user identifications associated with a single payment option of the subset of payment options to cluster each user identification of the subset of user identifications into multiple classifications. A logistic regression algorithm can be used in determining a first classification comprising a single user of the one or more users mapped to more than one of the subset of user identifications. A logistic regression algorithm can also be used in determining a second classification comprising one or more first users of the one or more users mapped to the more than one user identification of the subset of user identifications, wherein the one or more first users are part of the same household. Responsive to receiving a query, the method can include providing instructions to display a particular classification of the each user identification of the subset of user identifications at a computing device.

Many embodiments include a system. The system can include one or more processors and one or more non-transitory computer-readable media storing computing instructions configured to run on the one or more processors and perform certain acts. The acts can include receiving, at a back-end device of the system, a query from a user interface of a front-end device requesting two or more user identifications mapped to a same payment option of multiple payment options. In association with multiple transactions, the acts can also include receiving multiple user identifications of multiple users and their respective payment options of the multiple payment options. The acts can further include distilling a subset of payment options from among the multiple payment options. The acts can include distilling a subset of user identifications from among the multiple user identifications. Distilling a subset of user identifications can also include each payment option of the subset of payment options being associated with more than one user identification of the subset of user identifications. The acts can additionally include analyzing the subset of payment options to create an analysis of patterns based on the subset of user identifications associated with a single payment option of the subset of payment options. The acts can also include identifying, using the analysis, a first classification comprising a single user of the subset of user identifications. The first classification can also include the subset of user identifications being mapped to more than one user identification of the subset of user identifications. The acts can include identifying, using the analysis, a second classification comprising two or more first users of the subset of user identifications that are part of a same household. Responsive to receiving the query, the acts can further include sending instructions to display, on the user interface of the front-end device, at least one of the first classification or the second classification for each user identification of the subset of user identifications.

Several embodiments include a method. The method can include being implemented via execution of computing instructions configured to run at one or more processors and stored at one or more non-transitory computer-readable media. The method can further include, receiving, at a back-end device of the system, a query from a user interface of a front-end device requesting two or more user identifications mapped to a same payment option of multiple payment options. In association with multiple transactions, the method can also include receiving multiple user identifications of multiple users and their respective payment options of the multiple payment options. The method can further include distilling a subset of payment options from among the multiple payment options. The method can also include distilling a subset of user identifications from among the multiple user identifications, such that each payment option of the subset of payment options is associated with more than one user identification of the subset of user identifications. The method can additionally include analyzing the subset of payment options to create an analysis of patterns based on the subset of user identifications associated with a single payment option of the subset of payment options. The method can include identifying, using the analysis, a first classification comprising a single user of the subset of user identifications that is mapped to more than one user identification of the subset of user identifications. Further, the method can also include identifying, using the analysis, a second classification comprising two or more first users of the subset of user identifications that are part of a same household. Responsive to receiving the query, the method can also include sending instructions to display, on the user interface of the front-end device, at least one of the first classification or the second classification for each user identification of the subset of user identifications.

Various embodiments include a system. The system can include one or more processors and one or more non-transitory computer-readable media storing computing instructions configured to run on the one or more processors and perform certain acts. The acts can include receiving a query from a front-end device for one or more users mapped to a same payment option. The acts also can include generating, using a machine learning model, a first dataset comprising one or more classifications of one or more online users mapped to the same payment option as either (i) a single user with multiple user profiles or (ii) multiple users of a same household. The acts further can include generating, using a factor graph, a second dataset comprising first information of the one or more online users mapped to second information of one or more instore users. The first information can include a plurality of types of attributes of one or more user profiles of the one or more online users. The second information can include a plurality of instore transactions. The acts additionally can include mapping at least one of the one or more online users to at least one of the one or more instore users based on the second dataset. The acts also can include generating a third dataset by combining the first dataset and the second dataset. The third dataset can include the at least one of the one or more online users linked to the at least one of the one or more instore users. The acts can further include sending instructions to display the third dataset to the front-end device.

Many embodiments include a method. The method can include being implemented via execution of computing instructions configured to run at one or more processors and stored at one or more non-transitory computer-readable media. The method can include receiving a query from a front-end device for one or more users mapped to a same payment option. The method also can include generating, using a machine learning model, a first dataset comprising one or more classifications of one or more online users mapped to the same payment option as either (i) a single user with multiple user profiles or (ii) multiple users of a same household. The method further can include generating, using a factor graph, a second dataset comprising first information of the one or more online users mapped to second information of one or more instore users. The first information can include a plurality of types of attributes of one or more user profiles of the one or more online users. The second information can include a plurality of instore transactions. The method also can include mapping at least one of the one or more online users to at least one of the one or more instore users based on the second dataset. The method additionally can include generating a third dataset by combining the first dataset and the second dataset. The third dataset can include the at least one of the one or more online users linked to the at least one of the one or more instore users. The method further can include sending instructions to display the third dataset to the front-end device.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. For example, although the framework, algorithms, techniques, systems and methods of the present disclosure are described in the context of clustering customers using transaction patterns, applications of the disclosed framework, algorithms, techniques, systems and methods are also suitable for personalization, targeting, business analysis, etc. Moreover, the disclosed framework, algorithms, techniques, systems and methods are applicable wherever a traceable tender is available, and hence the disclosed framework, algorithms, techniques, systems and methods are viable beyond e-commerce setting as described herein (e.g., brick-and-mortar setting). For instance, a brick-and-mortar business may utilize the disclosed framework, algorithms, techniques, systems and methods to cluster and classify its in-store customers using patterns of their in-store transactions. Furthermore, the disclosed framework, algorithms, techniques, systems and methods may be used to cluster or classify customers across businesses, e.g., grouping Walmart.com customers and Sam's Club customers using traceable tender information. This helps identify intersection of the customer bases of two or more businesses, whether e-commerce or brick-and-mortar, and leads to cross-channel understanding of customers and better targeting and personalization. It is to be understood that other embodiments may be utilized, without departing from the scope of the present disclosure. It is to be understood that other embodiments may be utilized, without departing from the scope in accordance with the present disclosure.

What is claimed is:

1. A system comprising:
one or more processors; and
one or more non-transitory computer-readable media storing computing instructions configured to run on the one or more processors and perform:
receiving, at a back-end device, a query from a front-end device for one or more users mapped to a same payment option;
generating, using a machine learning model, a first dataset comprising one or more classifications of one or more online users mapped to the same payment option as either (i) a single user with multiple user profiles or (ii) multiple users of a same household;
generating, using a factor graph, a second dataset comprising first information of the one or more online users mapped to second information of one or more instore users, wherein the first information comprises a plurality of types of attributes of one or more user profiles of the one or more online users, and wherein the second information of the one or more instore users comprises a plurality of instore transactions;
recording contact information and biometric information of an instore user of the one or more instore users by a point-of-sale terminal at a store location, wherein the contact information and the biometric information is added as an observed variable of observed variables on the factor graph, wherein the biometric information comprises an image of the instore user, and wherein the contact information is linked to the second dataset;
mapping at least one of the one or more online users to at least one of the one or more instore users based on the second dataset;
generating a third dataset by combining the first dataset and the second dataset, wherein the third dataset comprises the at least one of the one or more online users linked to the at least one of the one or more instore users;
creating a unified view of each user of the one or more users based on transactions combined in the third dataset; and
sending instructions to display the third dataset to the front-end device.

2. The system of claim 1, wherein the computing instructions are further configured to perform:
training a machine learning model based on historical online transactions of the one or more online users, wherein input data for the machine learning model comprises the one or more user profiles of the one or more online users and one or more payment options used during a period of time, and output data for the machine learning model comprises the one or more classifications.

3. The system of claim 1, wherein the machine learning model comprises a logistic regression model.

4. The system of claim 1, wherein the computing instructions are further configured to perform:
determining one or more observed variable nodes and one or more unobserved variable nodes of the factor graph that have a shared usage of at least one same payment option, wherein the one or more user profiles are mapped to the same payment option;
creating dependences between the observed variables and unobserved variables of the factor graph based on an overlap of the shared usage of the at least one same payment option, wherein the factor graph models the dependencies between the observed variables and the unobserved variables in a probabilistic graphical model; and
encoding logic into a function node of function nodes on the factor graph, wherein the logic assigns connections between the observed variable nodes and the unobserved variable nodes of the factor graph.

5. The system of claim 1, wherein determining the second dataset further comprises:
identifying, using the machine learning model, a respective gender of each image of the instore user captured for each respective user identification of a subset of user identifications.

6. The system of claim 1, wherein determining the second dataset further comprises:
identifying one or more similarities between (a) a second type of attribute of the plurality of types of attributes in the first information and (b) the second information of the one or more instore users,
wherein mapping the at least one of the one or more online users to at least one of the one or more instore users further comprises:
mapping at least one user profile of the one or more user profiles to at least one instore user of the one or more instore users, wherein the at least one user profile comprises the contact information of the instore user.

7. The system of claim 1, wherein determining the second dataset further comprises:
calculating weights associated with the one or more user profiles, wherein the weights are calculated based on one or more similarities between the plurality of types of attributes associated with the one or more user profiles.

8. The system of claim 1, wherein the computing instructions are further configured to perform:
receiving third information indicating that unobserved variable nodes on the factor graph are related;
extending the factor graph to map the unobserved variable nodes to at least one same payment option based at least in part on the third information; and
determining, by logic, that the one or more user profiles are associated with the one or more instore users of a same household.

9. The system of claim 1, wherein the computing instructions are further configured to perform:
receiving multiple user identifications of the multiple users and respective payment options of multiple payment options in association with multiple transactions, wherein the one or more user profiles comprise the multiple user identifications associated with the multiple users, and wherein the multiple payment options comprise one or more same payment options;
distilling a subset of payment options from among the multiple payment options;
distilling a subset of user identifications from among the multiple user identifications, such that each respective payment option of the subset of payment options is associated with more than one user identification of the subset of user identifications;
analyzing the subset of payment options to create an analysis of patterns based on the subset of user identifications associated with a first single payment option of the subset of payment options;
identifying, using the analysis, a first classification of the one or more classifications comprising the single user of the subset of user identifications that is mapped to more than one user identification of the subset of user identifications; and
identifying, using the analysis, a second classification of the one or more classifications comprising two or more first users of the subset of user identifications that are part of the same household.

10. The system of claim 9, wherein the computing instructions are further configured to perform:
filtering each respective user identification of the subset of user identifications, comprising:
determining whether a record is classified in the first classification by determining a respective first similarity score for each of one or more respective multiple user identifications of the subset of user identifications mapped to a same payment option;
determining whether the record is classified in the second classification by determining similarities in user information; and
filtering the similarities using a second similarity score, wherein the determining whether the record is classified in the second classification further comprises:
searching the user information comprising at least first names, last names, and physical addresses;
applying an edit distance on the first names and the last names between all pairs of the user information in the record that shared a second single payment option;
filtering the user information by the second single payment option attributable to the multiple user identifications and by transaction history; and
clustering the user information into the second classification when the edit distance for the user information falls below a preset threshold,
wherein the respective first similarity score for each of the one or more respective multiple user identifications of the subset of user identifications is indicative of similarities between a string of one or more pieces of the user information associated with a respective one of the multiple user identifications and a respective string of the one or more pieces of the user information associated with each respective one or more other ones of the multiple user identifications.

11. A method being implemented via execution of computing instructions configured to run at one or more processors and stored at one or more non-transitory computer-readable media, the method comprising:
receiving, at a back-end device, a query from a front-end device for one or more users mapped to a same payment option;
generating, using a machine learning model, a first dataset comprising one or more classifications of one or more online users mapped to the same payment option as either (i) a single user with multiple user profiles or (ii) multiple users of a same household;
generating, using a factor graph, a second dataset comprising first information of the one or more online users mapped to second information of one or more instore users, wherein the first information comprises a plurality of types of attributes of one or more user profiles of the one or more online users, and wherein the second information of the one or more instore users comprises a plurality of instore transactions;
recording contact information and biometric information of an instore user of the one or more instore users by a point-of-sale terminal at a store location, wherein the contact information and the biometric information is added as an observed variable of observed variables on the factor graph, wherein the biometric information comprises an image of the instore user, and wherein the contact information is linked to the second dataset;
mapping at least one of the one or more online users to at least one of the one or more instore users based on the second dataset;
generating a third dataset by combining the first dataset and the second dataset, wherein the third dataset comprises the at least one of the one or more online users linked to the at least one of the one or more instore users;
creating a unified view of each user of the one or more users based on transactions combined in the third dataset; and
sending instructions to display the third dataset to the front-end device.

12. The method of claim 11, further comprising:
training a machine learning model based on historical online transactions of the one or more online users, wherein input data for the machine learning model comprises the one or more user profiles of the one or more online users and one or more payment options used during a period of time, and output data for the machine learning model comprises the one or more classifications.

13. The method of claim 11, wherein the machine learning model comprises a logistic regression model.

14. The method of claim 11, further comprising:
determining one or more observed variable nodes and one or more unobserved variable nodes of the factor graph that have a shared usage of at least one same payment option, wherein the one or more user profiles are mapped to the same payment option;
creating dependences between the observed variables and unobserved variables of the factor graph based on an overlap of the shared usage of the at least one same payment option, wherein the factor graph models the dependencies between the observed variables and the unobserved variables in a probabilistic graphical model; and
encoding logic into a function node of function nodes on the factor graph, wherein the logic assigns connections between the observed variable nodes and the unobserved variable nodes of the factor graph.

15. The method of claim 11, wherein determining the second dataset further comprises:
identifying, using the machine learning model, a respective gender of each image of the instore user captured for each respective user identification of a subset of user identifications.

16. The method of claim 11, wherein determining the second dataset further comprises:
- identifying one or more similarities between (a) a second type of attribute of the plurality of types of attributes in the first information and (b) the second information of the one or more instore users,
- wherein mapping the at least one of the one or more online users to at least one of the one or more instore users further comprises:
  - mapping at least one user profile of the one or more user profiles to at least one instore user of the one or more instore users, wherein the at least one user profile comprises the contact information of the instore user.

17. The method of claim 11, wherein determining the second dataset further comprises:
- calculating weights associated with the one or more user profiles, wherein the weights are calculated based on one or more similarities between the plurality of types of attributes associated with the one or more user profiles.

18. The method of claim 11, further comprising:
- receiving third information indicating that unobserved variable nodes on the factor graph are related;
- extending the factor graph to map the unobserved variable nodes to at least one same payment option based at least in part on the third information; and
- determining, by logic, that the one or more user profiles are associated with the one or more instore users of a same household.

19. The method of claim 11, further comprising:
- receiving multiple user identifications of the multiple users and respective payment options of multiple payment options in association with multiple transactions, wherein the one or more user profiles comprise the multiple user identifications associated with the multiple users, and wherein the multiple payment options comprise one or more same payment options;
- distilling a subset of payment options from among the multiple payment options;
- distilling a subset of user identifications from among the multiple user identifications, such that each respective payment option of the subset of payment options is associated with more than one user identification of the subset of user identifications;
- analyzing the subset of payment options to create an analysis of patterns based on the subset of user identifications associated with a first single payment option of the subset of payment options;
- identifying, using the analysis, a first classification of the one or more classifications comprising the single user of the subset of user identifications that is mapped to more than one user identification of the subset of user identifications; and
- identifying, using the analysis, a second classification of the one or more classifications comprising two or more first users of the subset of user identifications that are part of the same household.

20. The method of claim 19, further comprising:
- filtering each respective user identification of the subset of user identifications, comprising:
  - determining whether a record is classified in the first classification by determining a respective first similarity score for each of one or more respective multiple user identifications of the subset of user identifications mapped to a same payment option;
  - determining whether the record is classified in the second classification by determining similarities in user information;
  - filtering the similarities using a second similarity score, wherein the determining whether the record is classified in the second classification further comprises:
    - searching the user information comprising at least first names, last names, and physical addresses;
    - applying an edit distance on the first names and the last names between all pairs of the user information in the record that shared a second single payment option;
    - filtering the user information by the second single payment option attributable to the multiple user identifications and by transaction history; and
    - clustering the user information into the second classification when the edit distance for the user information falls below a preset threshold,
  - wherein the respective first similarity score for each of the one or more respective multiple user identifications of the subset of user identifications is indicative of similarities between a string of one or more pieces of the user information associated with a respective one of the multiple user identifications and a respective string of the one or more pieces of the user information associated with each respective one or more other ones of the multiple user identifications.

* * * * *